(12) United States Patent
Poole et al.

(10) Patent No.: US 11,402,669 B2
(45) Date of Patent: Aug. 2, 2022

(54) HOUSING SURFACE WITH TACTILE FRICTION FEATURES

(71) Applicant: Apple Inc., Cupertino, CA (US)

(72) Inventors: Joseph C. Poole, Hayward, CA (US); Christopher D. Prest, San Francisco, CA (US); Kyle J. Nekimken, San Jose, CA (US); Samuel O. Schneider, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 386 days.

(21) Appl. No.: 16/268,338

(22) Filed: Feb. 5, 2019

(65) Prior Publication Data

US 2019/0331940 A1 Oct. 31, 2019

Related U.S. Application Data

(60) Provisional application No. 62/663,943, filed on Apr. 27, 2018.

(51) Int. Cl.
*G02F 1/00* (2006.01)
*G06F 3/041* (2006.01)
*B82Y 30/00* (2011.01)

(52) U.S. Cl.
CPC ............ *G02F 1/0072* (2013.01); *G06F 3/041* (2013.01); *B82Y 30/00* (2013.01); *C03C 2217/76* (2013.01); *G02F 2201/56* (2013.01); *G06F 2203/04809* (2013.01)

(58) Field of Classification Search
CPC .................................................. C03C 2217/76
See application file for complete search history.

(56) References Cited

U.S. PATENT DOCUMENTS

| | | | |
|---|---|---|---|
| 4,633,323 A | 12/1986 | Haberkern et al. |
| 6,068,891 A | 5/2000 | O'Dell et al. |
| 6,677,703 B2 | 1/2004 | Ito et al. |
| 7,297,386 B2 | 11/2007 | Suzuki et al. |
| 7,646,143 B2 | 1/2010 | Kimura et al. |
| 8,092,911 B2 | 1/2012 | Sakoske et al. |
| 8,106,787 B2 | 1/2012 | Nurmi |
| 8,184,373 B2 | 5/2012 | Tanaka et al. |

(Continued)

FOREIGN PATENT DOCUMENTS

| | | |
|---|---|---|
| CN | 101712102 | 5/2010 |
| CN | 107683055 | 9/2012 |

(Continued)

OTHER PUBLICATIONS

Hedayati et al., Antireflective Coatings: Conventional Stacking Layers and Ultrathin Plasmonic Metasurfaces, A Mini-Review, Materials, vol. 9, No. 497, 2016.

(Continued)

*Primary Examiner* — Gustavo Polo
(74) *Attorney, Agent, or Firm* — Brownstein Hyatt Farber Schreck, LLP

(57) ABSTRACT

A glass component of an electronic device housing may define a textured surface having micro-scale tactile friction features that provide a specified friction between a user's finger and the glass component. More specifically, the tactile friction features may reduce a contact surface area that is in contact with the user's finger in order to produce a reduced or specified coefficient of friction.

20 Claims, 13 Drawing Sheets

(56) References Cited

U.S. PATENT DOCUMENTS

| | | |
|---|---|---|
| 8,213,085 B2 | 7/2012 | Liu et al. |
| 8,553,333 B2 | 10/2013 | Chang et al. |
| 8,576,561 B2 | 11/2013 | Myers et al. |
| 8,603,372 B2 | 12/2013 | Tanaka et al. |
| 8,681,113 B1 | 3/2014 | Wu et al. |
| 8,771,532 B2 | 7/2014 | Carlson et al. |
| 8,872,295 B2 | 10/2014 | Hermans et al. |
| 8,896,802 B2 | 11/2014 | Yoneyama et al. |
| 8,953,083 B2 | 2/2015 | Hedge |
| 9,017,566 B2 | 4/2015 | Lander et al. |
| 9,034,166 B2 | 5/2015 | Tatebe et al. |
| 9,154,678 B2 | 10/2015 | Kwong et al. |
| 9,239,594 B2 | 1/2016 | Lee et al. |
| 9,240,498 B2 | 1/2016 | Fujita et al. |
| 9,262,002 B2 | 2/2016 | Momeyer et al. |
| 9,377,603 B1 | 6/2016 | Cheng et al. |
| 9,448,713 B2 | 9/2016 | Cruz-Hernandez et al. |
| 9,554,482 B2 | 1/2017 | Wilson et al. |
| 9,644,281 B2 | 5/2017 | Tatebe et al. |
| 9,658,500 B2 | 5/2017 | Iwamoto |
| 9,720,141 B1 | 8/2017 | Cheng et al. |
| 9,732,237 B2 | 8/2017 | Sugamoto et al. |
| 9,745,221 B2 | 8/2017 | Ehrensperger et al. |
| 9,862,124 B2 | 1/2018 | Radcliffe et al. |
| 9,880,327 B2 | 1/2018 | Park et al. |
| 9,938,186 B2 | 4/2018 | Moll et al. |
| 9,961,337 B2 | 5/2018 | Stroetmann |
| 10,013,020 B2 | 7/2018 | Hong et al. |
| 10,043,052 B2 | 8/2018 | Wickboldt et al. |
| 10,101,583 B2 | 10/2018 | Saenger Nayver et al. |
| 10,171,636 B2 | 1/2019 | Yeo et al. |
| 10,214,445 B2 | 2/2019 | Hart et al. |
| 10,298,824 B2 | 5/2019 | Lee et al. |
| 10,442,151 B2 | 10/2019 | Ozeki et al. |
| 10,647,032 B2 | 5/2020 | Radcliffe et al. |
| 10,676,393 B2 | 6/2020 | Weber et al. |
| 10,690,818 B2 | 6/2020 | Chen et al. |
| 10,781,135 B2 | 9/2020 | Weber et al. |
| 10,827,635 B1 | 11/2020 | Limarga et al. |
| 10,843,439 B2 | 11/2020 | Gulati et al. |
| 10,866,616 B2 | 12/2020 | Seo et al. |
| 10,948,633 B2 | 3/2021 | Murakami et al. |
| 2002/0127565 A1 | 9/2002 | Cunningham |
| 2003/0011315 A1 | 1/2003 | Ito et al. |
| 2005/0266250 A1 | 12/2005 | Hayakawa |
| 2006/0024508 A1 | 2/2006 | D'Urso et al. |
| 2006/0034042 A1 | 2/2006 | Hisano et al. |
| 2007/0195419 A1 | 8/2007 | Tsuda et al. |
| 2009/0257207 A1 | 10/2009 | Wang et al. |
| 2012/0127755 A1 | 5/2012 | Shiau et al. |
| 2012/0194974 A1 | 8/2012 | Weber et al. |
| 2012/0218640 A1 | 8/2012 | Gollier et al. |
| 2012/0274565 A1 | 11/2012 | Moser et al. |
| 2013/0026593 A1 | 1/2013 | Hermans et al. |
| 2013/0235462 A1 | 9/2013 | Haas |
| 2013/0273324 A1 | 10/2013 | Moll et al. |
| 2013/0316133 A1* | 11/2013 | Kim ............. B32B 3/02 428/137 |
| 2014/0035869 A1 | 2/2014 | Yun et al. |
| 2014/0063609 A1 | 3/2014 | Iwata et al. |
| 2014/0098075 A1 | 4/2014 | Kwak et al. |
| 2014/0106127 A1 | 4/2014 | Lyons et al. |
| 2014/0327643 A1 | 11/2014 | Sun et al. |
| 2015/0090689 A1 | 4/2015 | Guilfoyle et al. |
| 2016/0154435 A1 | 6/2016 | Yanagisawa et al. |
| 2016/0188181 A1 | 6/2016 | Smith et al. |
| 2016/0224822 A1 | 8/2016 | Hasegawa et al. |
| 2016/0283014 A1 | 9/2016 | Rider et al. |
| 2016/0306390 A1 | 10/2016 | Vertegaal et al. |
| 2017/0026553 A1 | 1/2017 | Lee et al. |
| 2017/0058130 A1 | 3/2017 | Addleman et al. |
| 2017/0276618 A1 | 9/2017 | Takagi |
| 2017/0308234 A1 | 10/2017 | Li et al. |
| 2018/0042131 A1 | 2/2018 | Liu et al. |
| 2018/0086662 A1 | 3/2018 | Luzzato et al. |
| 2018/0162091 A1 | 6/2018 | Takeda et al. |
| 2018/0162768 A1 | 6/2018 | Boek et al. |
| 2018/0215657 A1 | 8/2018 | Jin et al. |
| 2018/0282201 A1 | 10/2018 | Hancock et al. |
| 2019/0032237 A1 | 1/2019 | Kim et al. |
| 2019/0037690 A1 | 1/2019 | Wilson et al. |
| 2019/0155339 A1 | 5/2019 | Fenton et al. |
| 2019/0230204 A1 | 7/2019 | Zhang |
| 2019/0236887 A1 | 8/2019 | Rich et al. |
| 2019/0241455 A1 | 8/2019 | Sweney et al. |
| 2019/0246018 A1 | 8/2019 | Rho et al. |
| 2019/0256410 A1 | 8/2019 | Isshiki et al. |
| 2020/0014780 A1 | 1/2020 | Jones |
| 2020/0026327 A1 | 1/2020 | Hendren et al. |
| 2020/0189966 A1 | 6/2020 | Lee et al. |
| 2020/0199020 A1 | 6/2020 | Hatano et al. |
| 2020/0301527 A1 | 9/2020 | Poole et al. |
| 2020/0304616 A1 | 9/2020 | Jones |
| 2020/0379143 A1 | 12/2020 | Gu et al. |
| 2020/0389991 A1 | 12/2020 | Shannon et al. |
| 2021/0014992 A1 | 1/2021 | Limarga et al. |
| 2021/0378117 A1 | 12/2021 | Shannon et al. |
| 2021/0397220 A1 | 12/2021 | Hendren et al. |
| 2022/0071039 A1 | 3/2022 | Limarga et al. |

FOREIGN PATENT DOCUMENTS

| | | |
|---|---|---|
| CN | 203013800 | 6/2013 |
| CN | 103502166 | 1/2014 |
| CN | 203406929 | 1/2014 |
| CN | 104024929 | 9/2014 |
| CN | 104583147 | 4/2015 |
| CN | 105283322 | 1/2016 |
| CN | 107438494 | 12/2017 |
| CN | 207070526 | 3/2018 |
| CN | 107911964 | 4/2018 |
| CN | 107924002 | 4/2018 |
| CN | 10832510 | 10/2018 |
| CN | 207992872 | 10/2018 |
| CN | 109202296 | 1/2019 |
| CN | 208433428 | 1/2019 |
| CN | 208461858 | 2/2019 |
| CN | 109547679 | 3/2019 |
| CN | 109640557 | 4/2019 |
| DE | 10223165 | 12/2003 |
| EP | 3454541 | 3/2019 |
| JP | 2011510904 | 4/2011 |
| JP | 2013242725 | 12/2013 |
| JP | 2016045824 | 4/2016 |
| JP | 2017508178 | 3/2017 |
| JP | 2018506851 | 3/2018 |
| KR | 20130127842 | 11/2013 |
| KR | 20160145081 | 12/2016 |
| KR | 20170076779 | 7/2017 |
| KR | 20180018782 | 2/2018 |
| TW | 201910882 | 3/2019 |
| WO | WO2014/011328 | 1/2014 |
| WO | WO2014/012003 | 1/2014 |
| WO | WO2015/191949 | 12/2015 |
| WO | WO2016/088983 | 6/2016 |
| WO | WO2016/196615 | 12/2016 |
| WO | WO2017/038868 | 3/2017 |
| WO | WO2019/027675 | 2/2019 |

OTHER PUBLICATIONS

Qi et al., "Simple Approach to Wafer-Scale Self-Cleaning Antireflective Silicon Surfaces," American Chemical Society, State Key Laboratory of Supramolecular Structure and Materials, College of Chemistry, Jilin University, Changchun 130012, P.R. China, 2009.

Tan et al., "Broadband antireflection film with moth-eye-like structure for flexible display applications," Optica, vol. 4, No. 7, pp. 678-683, Jul. 2017.

Author Unknown, "LG's Future Display Technology Will Blow You Away," Techno Source, https://www.youtube.com/watch?v=qlRjytgNuhM, 2 pages, May 2, 2017.

(56) References Cited

OTHER PUBLICATIONS

Ben-Yakar et al., "Femtosecond laser ablation properties of borosilicate glass," Journal of Applied Physics, vol. 96, No. 9, 8 pages, Nov. 1, 2004.

Seth, Radhika, "A Fresh New Look at the Computer," https://www.yankodesign.com/2009/02/06/a-fresh-new-look-at-the-computer, 1 page, Feb. 6, 2009.

Wimmer, "Curve: Revisiting the Digital Desk," NordiCHI '10: Proceedings of the 6th Nordic Conference on Human-Computer Interaction: Extending Boundaries, https://doi.org/10.1145/1868914.1868977, http://www.mmi.ifi.lmu.de/pubdb/publications/pub/wimmer2010Curve/wimmer2010Curve.pdf, https://dl.acm.org/doi/10.1145/1868914.1868977, pp. 561-570, Oct. 2010.

\* cited by examiner

HOUSING SURFACE WITH TACTILE FRICTION FEATURES

CROSS-REFERENCE TO RELATED APPLICATION(S)

This application is a non-provisional patent application of and claims the benefit of U.S. Provisional Patent Application No. 62/663,943 filed Apr. 27, 2018 and titled "Glass Surface with Tactile Friction Features," the disclosure of which is hereby incorporated by reference in its entirety.

FIELD

The described embodiments relate generally to electronic devices. More particularly, the present embodiments relate to surfaces of enclosures, input structures, and the like made from glass and having projections, depressions, or other structural features that provide tactile friction to an object touching the surface.

BACKGROUND

Electronic devices may be designed for a variety of uses. Many modern electronic devices are configured to be held in the hand of a user and many devices include touch-sensitive surfaces that receive a user touch. For some devices, a surface texture or material property of the housing may provide a suitable grip for hand-held applications. It may also be desirable that touch-sensitive surfaces provide a low friction interface to facilitate touch input. Some traditional devices provide a tactile feel by using a particular material or textured coating that extends along the exterior surfaces of the device. However, some textured coatings and materials are subject to wear over time and may not be sufficiently transparent for use in conjunction with a display of a device. The systems and techniques described herein may overcome some or all of these limitations with traditional techniques by forming a tactile surface directly into a surface of a glass component.

SUMMARY

Aspects described herein relate to tactile features formed along an exterior surface of an electronic device housing. In embodiments described herein, the tactile features may be perceptible by touch, but not individually perceptible by sight. The tactile features may provide a different level of friction with a touching object than a smooth housing surface and may therefore be referred to as "tactile friction features."

In embodiments, the electronic device housing may comprise a structure and an external surface of the electronic device housing may be defined, at least in part, by the structure. For example, the structure may be a cover glass, an input structure, a housing, and so on. The structure may define a set of tactile friction features. Each tactile friction feature may include a base, a tip or top, and a sidewall extending from the base to the tip or top. The structure may further define a base surface and the set of tactile friction features may extend outward from the base surface. In embodiments, the structure is a glass structure or comprises a glass layer which defines the base surface and the set of tactile friction features.

In further embodiments, the tactile friction features may provide a lower level of friction than a smooth housing surface. For example, when the shape and spacing of the glass tactile friction features prevent an object from touching the base surface, a lower level of friction may result. In additional embodiments, the tactile friction features may provide a higher level of friction than a smooth housing surface.

In aspects described herein, the tactile friction features further comprise a coating bonded to surfaces of the glass tactile friction features. For example, the tactile friction features may comprise an oleophobic coating bonded to the glass tactile friction features. The coating may be thin relative to dimensions of the glass tactile friction features.

Certain embodiments described herein take the form of an electronic device comprising an enclosure defining an internal volume and having a glass structure at least partially defining a touch-sensitive exterior surface of electronic device. The touch-sensitive exterior surface comprises: a base surface defining a first planar region having a first area and a set of tactile friction features distributed along the touch-sensitive exterior surface and extending above the base surface to define a second planar region having a second area less than the first area. The electronic device further comprises a touch sensor positioned below the glass structure and configured to detect a touch along the touch-sensitive exterior surface.

In further embodiments, the electronic device further comprises a display positioned under the glass structure. The glass structure comprises: a first region positioned over a visible portion of a display; and a second region at least partially surrounding the first region and not positioned over the visible portion of the display. In addition, the set of tactile friction features is a first set of tactile friction features positioned along the first region. The electronic device further comprises a second set of tactile friction features along the second region. A first pitch between tactile friction features of the first set of tactile friction features is different than a second pitch between tactile friction features of the second set of tactile friction features. In certain embodiments, the pitch of the first set of tactile friction features is an average distance between centers of adjacent tactile friction features. By the way of example, the pitch is greater than 1 micron and less than 1 mm, such as between 150 and 600 microns. The glass structure may be a cover glass and the cover glass may define, at least in part, the first set and the second set of the tactile friction features.

In further embodiments, an electronic device comprises a display and a touch sensor positioned over the display. The electronic device further comprises an enclosure comprising a glass structure enclosing the display and defining an exterior surface of the electronic device, the exterior surface of the electronic device having a set of glass tactile friction features. Each glass tactile friction feature of the set of glass tactile friction features includes a base having a micro-scale width, a top, a sidewall extending from the base to the top, and a height between the base and the top, the height being less than or equal to the width.

In additional embodiments, an electronic device comprises a display; and an enclosure at least partially surrounding the display and including a structure. The structure defines: a base surface and a set of tactile friction features extending outward from the base surface, adjacent pairs of the tactile friction features having circular bases separated by an interstitial region of the base surface.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

Figure 1A:
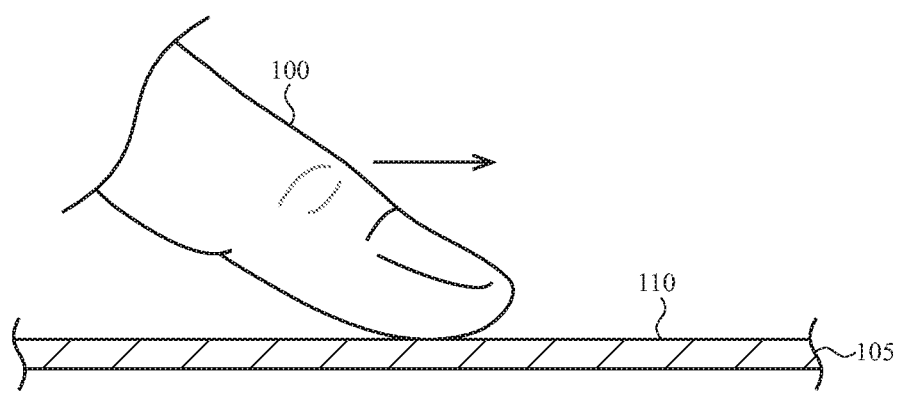
FIG. 1A shows a finger touching and moving across a glass surface.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure generally relates to housing surfaces that include tactile features. In embodiments, a glass surface (e.g., a base surface) of the housing has protrusions or depressions ("tactile features") that provide a different coefficient of friction with a touching object than a smooth glass surface does, and so provides a different feel than does a glass surface lacking such tactile features. Tactile features that change a coefficient of friction for a finger or other object in contact with the tactile feature, as compared to a glass surface that is substantially smooth or otherwise lacks such features, are called "tactile friction features" in this document. Further, it should be understood that references to "friction" in this document are to kinetic friction, unless otherwise stated.

Generally, a surface feels "smooth" or "sticky" to the touch at least in part due to the friction between a user's skin and the object. The lower the friction, the smoother the object feels. Likewise, the higher the friction, the stickier the object feels (for example, the more easily it is gripped). Similarly, the lower the coefficient of friction between a surface and an object in contact with that surface, the less energy is required to move the object along the surface. Accordingly, the coefficient of friction between a user's skin and a surface affects not only the feel of the surface but the effort (e.g., amount of energy) required to move along the surface.

It may be useful to provide a surface, such as a glass surface, with a particular feel by ensuring the coefficient of friction between typical human skin and the surface falls within a particular range. A touch screen of an electronic device may be both tactilely pleasant and relatively easy to use (e.g., requiring low energy to move along) if it is smooth. By contrast, a glass enclosure for the same electronic device may be easier to hold if it is sticky or otherwise "grippy." As yet another example, a single enclosure surface or glass surface might have two different coefficients of friction—and thus two different "feels" in separate areas. This may be useful to differentiate an input region of the enclosure surface or glass surface from a non-input region, as one non-limiting example. In embodiments, the dynamic coefficient of friction, the static coefficient of friction, or a combination thereof is tailored to provide a desired "feel" to the electronic device.

Without being bound to a particular theory, a surface's coefficient of friction with respect to a moving body (e.g., dynamic coefficient of friction) may be described as being a combination of two different effects that may be generally referred to as mechanical friction and intermolecular adhesion. The term "mechanical friction" may be used to refer to the interaction of physical structures (asperities) on two surfaces moving with respect to one another. Thus, when a fingerprint ridge, bump, or other portion of skin contacts a projection or protrusion on a surface while the finger is moving over the surface, mechanical friction results. Skin asperities can be ridges, bumps, temporary or permanent deformations of the epidermis, and so on. Surface asperities include projections, protrusions, depressions, and other structures that render a surface uneven or otherwise discontinuous. It should be appreciated that many asperities on a surface may be invisible to the naked eye. Additionally, skin asperities may be temporary, as when skin deforms in response to an external force (like that of a protrusion pressing into the skin).

The term "intermolecular adhesion," as used herein, may be used to refer to frictional effects due to the attraction of nearby molecules to one another, as well as the attraction of molecules to nearby atoms or ions. Van der Waals forces are an example of intermolecular adhesion. Generally, intermolecular adhesion varies directly with the contact area of two surfaces. Thus, as contact area increases, intermolecular adhesion increases. As contact area decreases, intermolecular adhesion decreases. Generally, intermolecular friction can be as much as five times as strong as mechanical friction. Thus, in many embodiments intermolecular adhesion provides a much greater portion of overall friction than does mechanical friction. Accordingly, controlling the contact area between two surfaces directly influences friction between the surfaces, and thus whether the surface feels smooth or sticky/grippy.

By including tactile friction features protruding from a housing surface (or, in some embodiments, recessed into the housing surface), the contact area between skin and the housing surface can be controlled. This can permit control of the coefficient of friction and thus the feel of the housing surface to a person touching it. In embodiments, the contact area is different than a surface area of the glass enclosure. In further embodiments, the contact area of the tactile friction features is different from the contact area of a corresponding flat surface. For example, the contact area of the tactile friction features may be less than the contact area of a corresponding flat surface. Typically, the tactile friction features are provided along an exterior or outer surface of the electronic device. In embodiments, the housing surface is a glass surface.

As discussed with respect to FIGS. 3-15, one or more physical characteristics (height, radius, width, length, shape, separation distance, and so on) of the tactile friction features can affect whether the surface feels smooth or sticky/grippy. In addition, the presence of a surface coating (e.g., an oleophobic coating) can further affect the feel of the surface. These and other embodiments are discussed below with reference to FIGS. 1A-16. However, those skilled in the art will readily appreciate that the detailed description given herein with respect to these figures is for explanatory purposes only and should not be construed as limiting.

FIG. 1A illustrates a finger 100 moving along a glass surface 110 of glass structure 105. The movement of the finger 100 may correspond to a touch input on a touch-sensitive surface of a device. The touch input may include gesture input that involves movement of the finger 100 while applying light pressure to the glass surface 110. Touch input may also correspond to taps, momentary touches, twisting finger input, and other types of touch input that can be performed using a finger. While the following examples are provided with respect to finger-touch input, similar principles may be applied for stylus input or input using another type of object.

The glass surface 110 may define a portion of an electronic device enclosure. For example, the glass structure 105 may be a cover glass, an input structure, a housing, component of an enclosure, and so on. In embodiments, the enclosure may include both a front and a rear cover glass. In additional embodiments, the glass structure 105 may form part or all of a housing or enclosure. In further embodiments, the glass structure 105 may a single monolithic component (e.g. a single piece of glass) which defines a back cover and a housing or a front cover, a back cover, and a housing. In some cases, the glass structure 105 may define substantially the entire front surface of a device as well as a portion of a surrounding sidewall or side of the device. The glass structure 105 may also define substantially the entire rear surface of the device as well as a portion of a surrounding sidewall or side of the device. Likewise, the glass structure 105 may define front, rear, and sides of a device.

Generally, as the finger 100 moves along the glass surface 110, its motion is opposed by friction between the finger 100 and the glass surface 110. The higher the coefficient of friction, the more energy is required to move the finger 100 and the rougher (or stickier, or more easily gripped) the glass surface 110 feels.

Figure 1B:
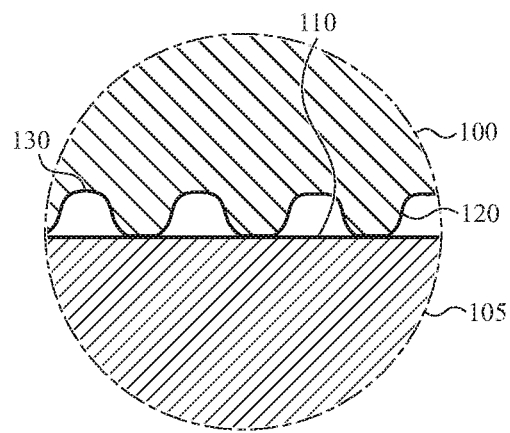
FIG. 1B is a cross-section view of a portion of the finger and glass surface of FIG. 1A.

FIG. 1B illustrates a cross-section view of a portion of the finger 100, glass surface 110, and glass structure 105 of FIG. 1A. As shown, the finger's fingerprint ridges 120 contact the glass surface 110 while fingerprint valleys 130 do not. As the contact area between the finger 100 and glass surface 110 increases, the coefficient of friction increases as does the friction itself.

Figure 1C:
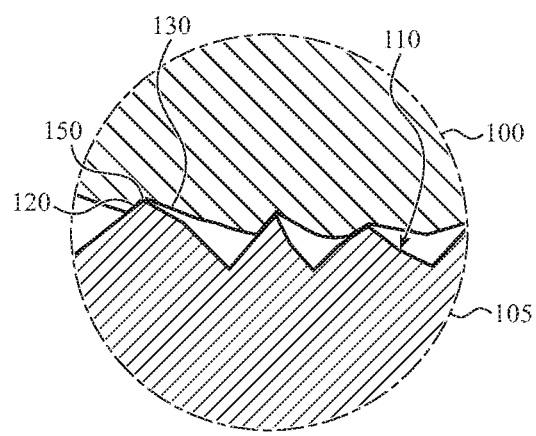
FIG. 1C is a detail view of a portion of the finger and glass surface of FIG. 1B.

FIG. 1C is a close-up view of a fingerprint ridge 120 contacting the glass surface 110. In this magnified view asperities 150 in the glass surface 110 of glass structure 105 are visible, such as ridges and peaks. The finger's skin catches on these asperities 150 and the skin deforms. This gives rise to mechanical friction, as discussed above. Asperities 150 of FIG. 1C define local high points of the glass surface. The glass surface of FIG. 1C can be viewed as having adjacent peaks connected by a valley which defines a (local) low point of the glass surface. The roughness of such a glass surface may be measured from a mean line, with the high and low points typically being respectively located above and below the mean line.

Figure 1D:
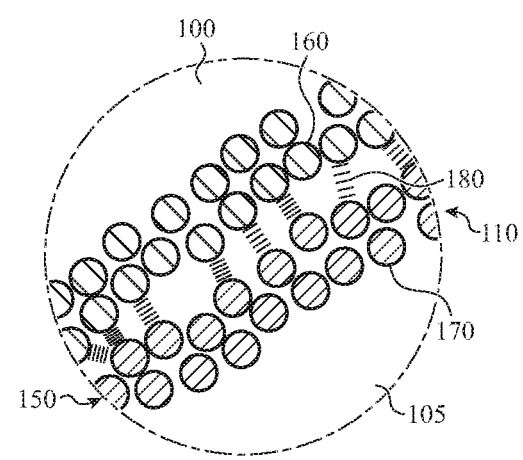
FIG. 1D is a detail view of a portion of the finger and glass surface of FIG. 1C.

FIG. 1D is a close-up view of a portion of the finger 100 contacting an asperity 150 on the surface 110 of glass structure 105. Here, the close-up view illustrates the individual molecules 160 of the skin of finger 100, the individual atoms 170 of glass surface 110, and the bonds 180 created between them by intermolecular adhesion. It should be appreciated that intermolecular adhesion occurs only where the skin molecules 160 contact the glass atoms 170 (or are in very close proximity). As previously mentioned, increasing the contact area between skin and glass increases the intermolecular adhesion between the two and thus the coefficient of friction.

Figure 2:
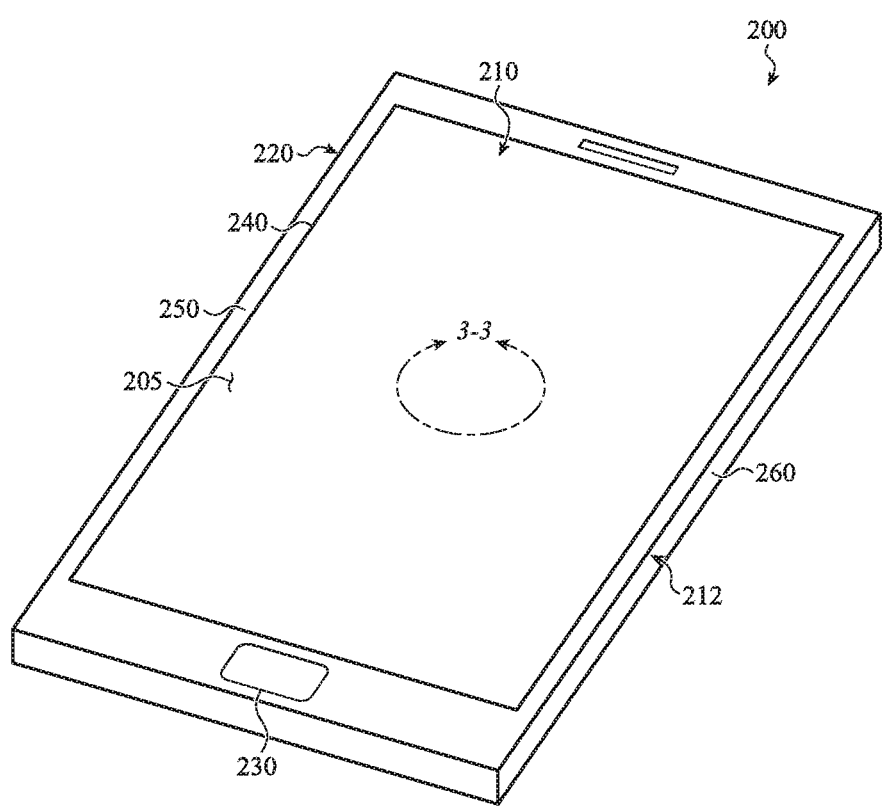
FIG. 2 illustrates a sample electronic device incorporating a cover that has tactile friction features.

FIG. 2 shows a sample electronic device 200. In some embodiments, the electronic device 200 may be a mobile telephone, a notebook computing device (e.g., a notebook), a tablet computing device (e.g., a tablet), a portable media player, a wearable device, or another type of portable electronic device. The electronic device 200 may also be a desktop computer system, computer component, input device, appliance, or virtually any other type of electronic product or device component.

As shown in FIG. 2, electronic device 200 has an enclosure 220 including a cover 205 (example glass structure). The cover 205 may be affixed to a housing 260 to form an exterior of the electronic device 200. The cover 205 may define a front surface 210 and the housing 260 may define a side surface 212 of the electronic device.

In aspects of the following disclosure, the cover may be described as a cover glass. However, more generally the cover may be formed from multiple layers that include glass sheets, polymer sheets, and/or various coatings and layers. Typical covers herein are thin, typically less than 5 mm in thickness, and more typically less than 3 mm in thickness. In some aspects, the cover can be from about 0.1 mm to 2 mm in thickness, and more typically from 0.15 mm to 1 mm in thickness.

While some of the following embodiments are described with respect to a cover 205, the same or similar principles may be applied to any component that defines a portion of an external surface of a device. For example, another example glass component may define a portion or all of an internal cavity of the electronic device 200 that is configured to receive the various electronic components of the electronic device 200. In some cases, the glass component (in this case the cover 205) may define an entire or substantially an entire front surface of the electronic device 200, as well as one or more sides or sidewalls of the electronic device 200. Similarly, the glass component may define an entire or substantially an entire rear surface of the electronic device 200, as well as one or more sides or sidewalls of the electronic device 200. Further, the glass component may be a monolithic component that defines the front surface, rear surface, and one or more side surfaces of the electronic device 200.

In some embodiments, the enclosure may at least partially surround a display and the cover may be positioned over the display. The display may be configured to produce a graphical output that is viewable through the cover 205. The cover 205 may define a transparent window region or window portion through which the graphical output may be viewed. The tactile friction features, as described herein, may be distributed along the transparent window region or window portion of the cover 205.

In embodiments, the electronic device comprises a touch sensor configured to detect a touch or touch input along a region of the exterior surface of the electronic device. The region of the exterior surface is thus touch-sensitive. In some instances, a touch-sensitive layer or touch sensor (e.g., a capacitive touch sensor) is positioned below the cover 205 and, in some cases, positioned between the cover 205 and the display. The cover 205 is configured to allow the touch sensor to detect the touch or touch input along the region of the exterior surface of the cover 205. By the way of example, a glass structure (such as a cover) may define a display window region and the touch sensor may be configured to detect a touch or touch input along the display window region.

As described herein, the tactile friction features may be configured to produce a specific tactile effect or friction with a user's finger to facilitate smooth gesture or other touch input along a touch-sensitive region of the cover 205. For example, the tactile friction features may be configured to provide a specific frictional resistance to a touch gesture. The friction features may also be configured to provide sufficient transparency to allow graphical output from the display to be viewed through the cover 205 without significantly altering the visual quality of the graphical output.

A variety of electronic device components may be positioned within the enclosure 220. For example, the electronic device may comprise one or more of a display, a processing unit, memory, an input/output device, a power source, a network communication interface, a camera, and a sensor. Components of a sample electronic device are discussed in more detail below with respect to FIG. 16.

Generally, the cover 205 and/or enclosure 220, as well as the input structure 230, may all comprise glass having tactile friction features. In some embodiments, a single element (e.g., the cover 205, enclosure 220, input structure 230, housing 260 or other portions of the electronic device 200) may have different sets of tactile friction features in different regions.

For example, a first set of tactile friction features with a first physical characteristic (height, radius, width, length, shape, separation distance, and so on) may be formed in a first region 240 of the cover 205 corresponding to a display area. A second set of tactile friction features with a second, different physical characteristic may be formed in and defined by a second region 250 of the cover glass that corresponds to a non-display area.

Given the change in physical characteristic, the contact area between the finger and the tactile friction features will vary between the two regions 240, 250. Thus, a user touching the cover glass in the display area 240 will have a first sensation controlled by the first coefficient of friction. The same user touching the cover 205 in the non-display area 250 will feel a second sensation since the coefficient of friction will be different. Further, the difference in physical characteristic (which results in a difference in contact area) may be visually undetectable or invisible to the human eye. Thus, even though the cover 205 may be visually continuous such that the first and second regions 240, 250 are visually indistinguishable, the feel of the two regions may be very different to a user. This may provide a tactile indication of where the display region 240 ends and the non-display region 250 begins, even if the device is powered off. Some embodiments may pattern or change physical characteristics of tactile friction features in input regions and non-input regions to likewise provide physical feedback to a user, indicating where inputs may be accepted by an electronic device 200.

In additional embodiments, a first set of tactile friction features with a first physical characteristic may be formed on cover 205 while a second set of tactile friction features with a second physical characteristic may be formed on another part of enclosure 220. For example, the first set of tactile friction features may be formed to give a smooth feel to cover 205 while a second set of tactile friction feature may be formed to give a sticky/grippy feel to a rear cover glass and/or to housing 260.

Figure 3:
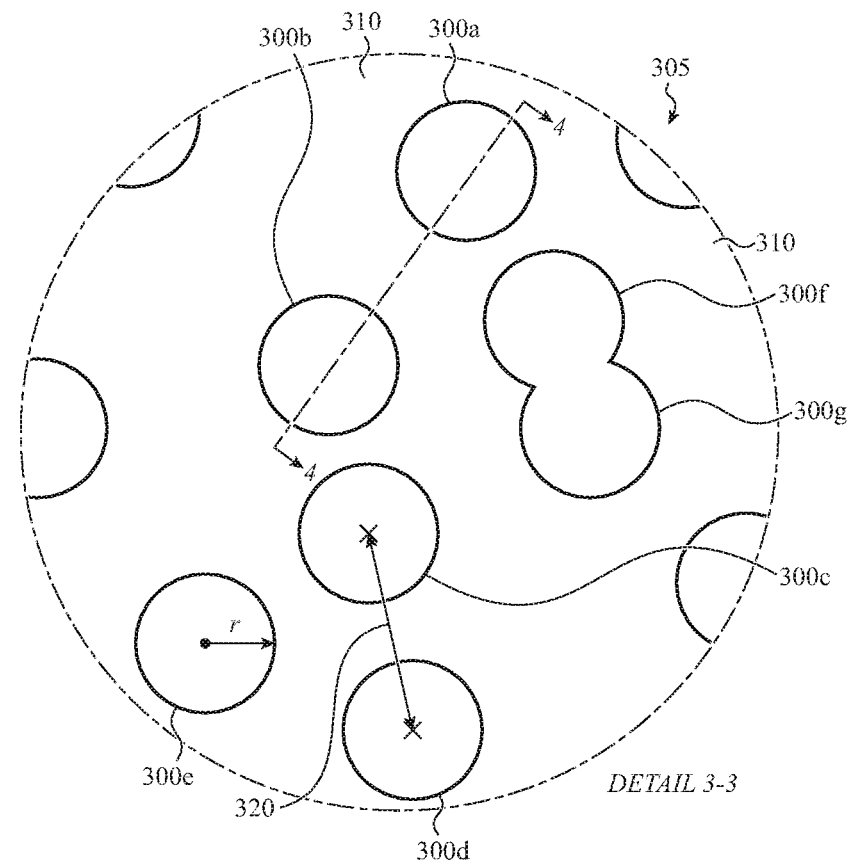
FIG. 3 is a detail view of a portion of section 3-3 of FIG. 2, illustrating the tactile friction features on a glass cover at a greatly exaggerated scale.

FIG. 3 shows a detail view of a portion of section 3-3 of a cover glass 305 which is an example of cover 205 shown in FIG. 2. It should be appreciated that the scale of FIG. 3 is greatly exaggerated as compared to the scale of FIG. 2, in order to illustrate certain features. As shown in FIG. 3, multiple tactile friction features 300a, 300b, 300c, 300d, 300e, 300f, 300g (collectively referred to with number "300") are present on or in the cover glass 305. The tactile friction features may be distributed along a particular region of the cover glass and/or along a particular touch-sensitive surface of the electronic device. The cover glass 305 defines a base surface 310 which surrounds each of the tactile friction features 300a, 300b, 300c, 300d, 300e, 300f, 300g.

The tactile friction features 300 are randomly spaced apart from one another but have an average "pitch" (e.g., separation distance) 320. As referred to herein, the pitch is the distance between the centers of two adjacent tactile friction features 300. In some cases adjacent tactile friction features may abut one another or even merge into one another, as do tactile friction features 300f and 300g. In other cases, the separation distance between two tactile friction features may be much greater than the average pitch 320, as is the case with tactile friction features 300d and 300g. Across a sufficiently large region or part of a glass structure, however, the pitch will have an average value. In embodiments, the average pitch is micro-scale, having a size from 1 micron to less than 1 mm. In embodiments, the average pitch is from 5 to 600 microns, from 10 to 100 microns, or from 5 to 50 microns. The tactile friction features 300 may be substantially evenly distributed along a region of the cover even though the spacing between any two adjacent tactile friction features may vary.

In additional embodiments, an average width (or diameter) of the tactile friction features is also micro-scale. In embodiments, the average width of the set of tactile friction features ranges from 1 micron to 50 microns, from 1 micron to 20 microns, from 2 microns to 50 microns, or from 5 microns to 25 microns. Further, the average width of the tactile friction features may be less than the average pitch.

As shown in FIG. 3, each of the friction features 300a-300e define a circular contour and a circular shape as viewed from above. The contour and shape of a friction feature as viewed from above may be defined by a top 324 of the friction feature. Friction features 300f and 300g, which contact each other, each define a shape which is a segment of a circle and a contour in the form of a circular arc. In embodiments, the bases of at least some of the friction features (e.g., friction features 300a-300e) also define a circular contour and may be described as circular bases.

Varying the average pitch 320 can affect the coefficient of friction between a user's skin and the cover glass, such as when the user's finger applies a touch gesture to the electronic device. If adjacent tactile friction features contact each other, then the pitch between the features is determined by the half widths of the adjacent tactile friction features. As the average pitch 320 approaches zero, then the tactile friction features 300 substantially overlap and the cover glass would be substantially flat on the macro scale, although asperities too small for the human eye to see would still exist. As the pitch 320 increases, skin moving across the cover glass comes into contact with less and less area and so the coefficient of friction between the user's finger and the cover glass can decrease. This is discussed in more detail below with respect to FIG. 5.

When the pitch becomes sufficiently large, however, the tactile friction features 300 are spaced so far apart that skin can sag or drop down between adjacent features to the point that the skin contacts the base surface 310 of the glass. This can have the effect of increasing contact area between the skin and the cover glass, which in turn increases the coefficient of friction. Thus, depending on the particular geometries of the tactile friction features 300, increasing pitch 320 beyond a threshold can increase friction between the cover glass (or other article) and skin, rather than decrease it. In embodiments where a relatively low coefficient of friction is desired, the tactile friction features 300 may be configured to prevent a user's finger from touching the base surface when performing a touch gesture.

In embodiments, the coefficient of friction depends on the height of the tactile friction features 300 as well as the pitch. The average height of the tactile friction features may be micro-scale or nano-scale (having a size from 1 nm to less than 1 micron). In embodiments, the average height of the tactile friction features is less than or equal to 10 microns, less than or equal to 5 microns, less than or equal to 2 microns, or less than or equal to 1 micron. In further embodiments, the average height of the tactile friction features is from 100 nm to 10 microns, from 200 nm to 2 microns, from 200 nm to 1 micron, or from 500 nm to 5 microns.

For a cylindrical tactile friction feature 300 having a radius of approximately 2.5 microns and a height of 0.25-0.5 microns, a pitch 320 greater than about 600 microns can cause the coefficient of fiction between a typical human finger and the cover glass to increase. The pitch may be as low as 1-10 nanometers in some embodiments, such as embodiments formed through non-imprinting processes, but is typically between 5 and 600 microns. For a tactile friction feature 300 having a constant radius of 2.5 microns and a height of 0.5 microns, a pitch of approximately 15-20 microns may be used to reduce the coefficient of friction. Decreases in pitch below about 15 microns or above about 20 microns may cause increases in the coefficient of friction, in such an embodiment.

The foregoing values presume the finger exerts approximately 50 grams of force on the glass. It should be appreciated that the force exerted by a user on the glass will also alter the coefficient of friction between glass and skin.

As shown in FIG. 3, at least some of the adjacent tactile friction features are spaced apart from one another. The space between a pair of adjacent tactile friction features may be referred to as a channel or as an interstitial region (e.g., interstitial region 302 in FIG. 4). The interstitial region may be defined by the pair of adjacent tactile friction features and a portion of the base surface 310 (e.g., interstitial region 314 of the base surface 310 in FIG. 4). One measure of the spacing between a pair of adjacent friction features is the minimum spacing between edges of a pair of adjacent friction features (or edge to edge spacing). This spacing may be referred to as a channel spacing or as an interstitial region width. Generally, a channel or interstitial aspect ratio may be defined as the tactile friction feature height divided by the spacing between adjacent tactile friction features (e.g., pitch minus tactile friction feature diameter for the tactile friction features 300). Similarly, an average channel or interstitial aspect ratio may be defined by the average tactile friction feature height defined by the average spacing between adjacent tactile friction features. For a human finger exerting about 50 g normal force on a set of tactile friction features, an average channel aspect ratio of about 0.01 to about 0.08 yields relatively low friction.

It should be appreciated that the pitch 320 or channel aspect ratio at which friction begins increasing may vary for different people and even for the same person at different times, as the water content, elasticity, thickness, and other physical characteristics of skin change. Accordingly, the foregoing values are illustrative and may vary in different embodiments.

Figure 4:
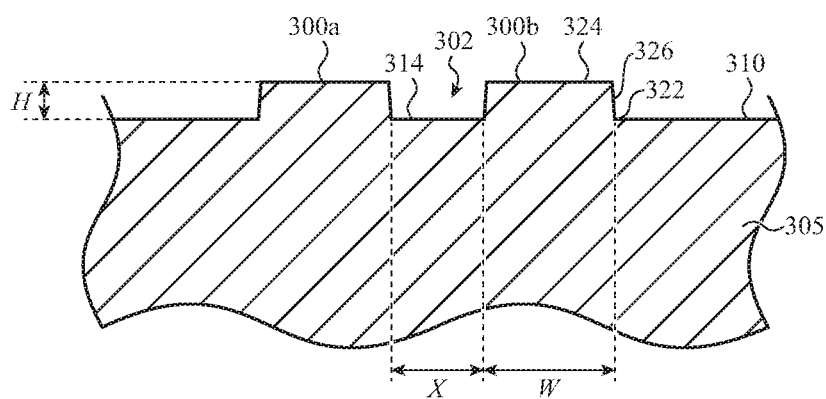
FIG. 4 is a cross-section view taken along line 4-4 of FIG. 3, showing the tactile friction features.

FIG. 4 is a cross-sectional view taken along line 4-4 of FIG. 3, illustrating two tactile friction features 300a, 300b extending upward from a base surface 310 of the cover glass 305. In embodiments, tactile friction features provided on an enclosure extend outward from the base surface 310 (e.g., above the base surface and away from the interior of the enclosure). As shown in FIGS. 3 and 4, the tactile friction features 300a, 300b are generally cylindrical with a substantially vertical sidewall 326. In embodiments, the tactile friction features comprise glass tactile friction features and the composition of the glass tactile friction features is substantially the same as that of the cover glass.

As shown in FIG. 4, the tactile friction features (e.g., 300b) have a base 322 located along base surface 310. The tactile friction features also have a top 324 located at a height H above base surface 310. In embodiments, the surface defined by top 324 (i.e., the top surface) is flat or flat to within a specified tolerance. Sidewall 326 extends from base 322 to top 324. A set of tactile friction features may have an average height. In embodiments, a set of the tactile friction features has a substantially uniform height, so that the heights of individual tactile friction features in the set are substantially the same. In embodiments, the heights of individual tactile friction features may be uniform to within a specified amount of variation, such as +/−10%, +/−5%, or +/−2%.

In embodiments, the base surface 310 defines a first region and the tops 324 of the tactile friction features 300b define a second region. The first region and the second region may each be planar to within a specified tolerance, and may therefore be referred to as a first planar region and a second planar region. For example, the specified tolerance may be 1 micron, 500 nm, 250 nm, 100 nm, 50 nm, 10 nm, or 5 nm. The second planar region may be offset from the first planar region by the (average) height of the tactile friction features. The first planar region may have a first area and the second planar region may have a second area. In embodiments, the second area is less than the first area. As shown in FIG. 3, the second region defined by the tops 324 of the tactile friction features and the first region defined by the base surface 310 need not be contiguous.

As shown in FIG. 4, the interstitial region 314 of the base surface 310 may be substantially flat or planar between tactile friction features 300a, 300b. Generally, the tactile friction features have a width W; for the cylindrical tactile friction features 300a, 300b the width is a diameter. A set of tactile friction features may have an average width. In embodiments, a set of the tactile friction features has a substantially uniform width, so that the widths of the individual tactile friction features in the set are substantially the same. In embodiments, the widths of individual tactile friction features may be uniform to within a specified amount of variation, such as +/−10%, +/−5%, or +/−2%. In embodiments, the average width of the tactile friction features may be less than, equal to, or greater than the average height of the tactile friction features. In additional embodiments, the tactile friction features may be described by an aspect ratio defined as the height divided by the width.

As was discussed with respect to FIG. 3, tactile friction features 300a and 300b are spaced apart by a pitch. As shown in FIG. 4, channel or interstitial region 302 is the space between a pair of adjacent tactile friction features. Typically the channels or interstitial regions 302 are not aligned along a given direction across a large portion of the glass surface in order to avoid anisotropy in the coefficient of friction (e.g., to avoid a "tramlining" effect). In embodiments, the tactile friction features are not arranged in a regular array, such as square or a hexagonal array, across a large portion the glass surface. Instead, the positions of the tactile friction features may be randomized.

In addition, tactile friction features 300a and 300b are separated by a distance X between sidewalls of the adjacent tactile friction features (also termed "channel spacing" or "interstitial region width," e.g., pitch minus tactile friction feature width). For tactile friction features having a substantially vertical sidewall, the distance X is substantially the same at the top 324 and the base 322 of the sidewall 326. The channel aspect ratio of the channel or interstitial region 302 defined between tactile friction features 300a, 300b is therefore H/X. When the spacing between tactile friction features varies, a set of the tactile friction features may have an average channel spacing (an average of the distances X) and the channel aspect ratio may be a ratio of the average height to the average channel spacing. For example, a channel aspect ratio to produce a smooth effect may be from 0.01 or greater, while a channel aspect ratio to produce a grippier effect may be less than 0.01.

It should be appreciated, however, that the tactile friction features 300 may have any suitable shape, angle, or orientation of the sidewall, and/or number of sidewalls. For example, the tactile friction features 300 may be conical, ovoid, arched, have a curved upper surface, rectangular, polygonal, a frustum of a shape such as a cone, and so on. Likewise, the sidewall(s) may be curved, rounded, multi-faceted, and the like. In addition, at least some of the bases and/or the tops of the tactile friction features 300 may define a contour which is generally circular, oval, or polygonal. FIGS. 7-15 show additional examples of tactile friction feature shapes. In embodiments, the description of physical characteristics such as height, width, and separation distance of the tactile friction features of FIGS. 3 and 4 may also apply to the tactile friction features of FIGS. 5-15.

Figure 5:
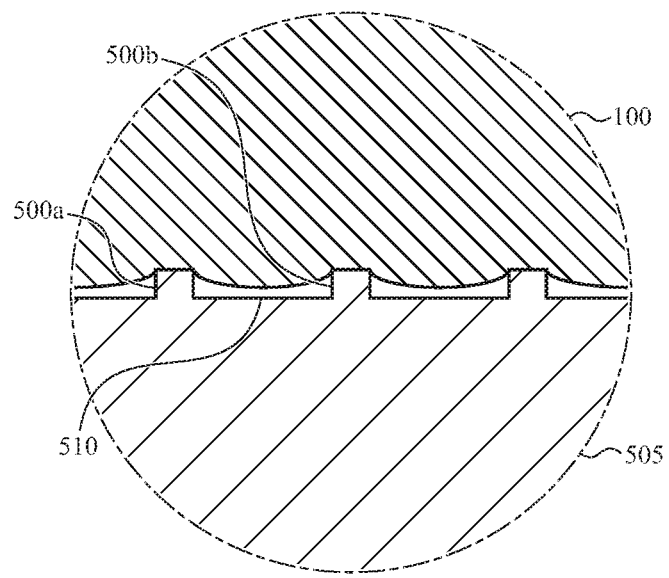
FIG. 5 is a first cross-section view of a finger contacting tactile friction features formed on a glass surface.

FIG. 5 is a cross-sectional view showing skin of a finger 100 in contact with multiple tactile friction features 500a, 500b of glass structure 505. As illustrated, the tactile friction features 500a, 500b are of sufficient height, width, and pitch that they prevent the finger 100 from touching the base surface 510 of the glass. Accordingly, the contact area between the finger 100 and glass structure 505 is limited to the surface area of the touched tactile friction features. As this is less area than would be contacted if the glass lacked the tactile friction features 500, it can be appreciated that the glass structure 505 would feel smooth, slippery, or the like to the touch. Tactile friction features producing a smooth effect may be provided, for example, on a cover glass or other input component of an enclosure. In embodiments, a ratio of the average height to the average channel spacing between features to produce a smooth effect is from 0.01 to 10, 0.01 to 2, or 0.05 to 5.

Figure 6:
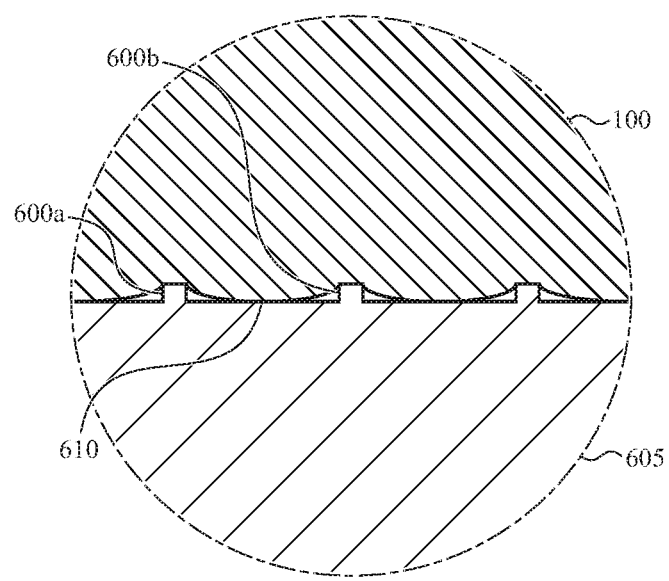
FIG. 6 is a second cross-section view of a finger contacting tactile friction features formed on a glass surface.

In contrast, FIG. 6 illustrates a glass structure 605 having tactile friction features 600a, 600b that are too small and/or spaced apart by too great a pitch to prevent skin of finger 100 from touching the base surface 610 of the glass structure 605. For example, the channel aspect ratio does not prevent the skin from touching the base surface. Thus, while the coefficient of friction between the finger 100 and the glass structure 605 may be reduced somewhat by the tactile friction features 600a, 600b, this embodiment will feel stickier than the embodiment shown in FIG. 5. The embodiment shown in FIG. 6 illustrates an example where the pitch is large enough that the coefficient of friction, while not as large as if the tactile friction features 600a, 600b were absent, nonetheless is greater than if the features were closer together.

In additional embodiments, the pitch may be large enough that the coefficient of friction is larger than if the tactile friction features 600 were absent. Tactile friction features to enhance stickiness may be provided, for example, on a peripheral surface of an enclosure, a rear cover glass, or other such component of an enclosure. In embodiments, a ratio of the average height to the average channel spacing between features to enhance stickiness is from $1 \times 10^{-5}$ to less than $1 \times 10^{-2}$, $1 \times 10^{-5}$ to $1 \times 10^{-3}$, or from $1 \times 10^4$ to $1 \times 10^{-2}$.

Figure 7A:
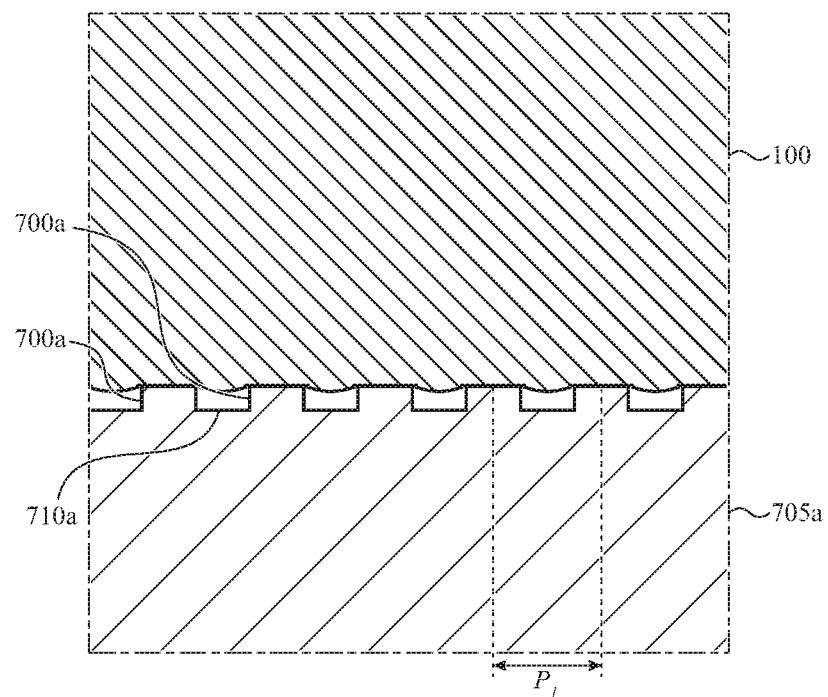
FIG. 7A shows a first sample distribution of tactile friction features on a glass surface.
Figure 7B:
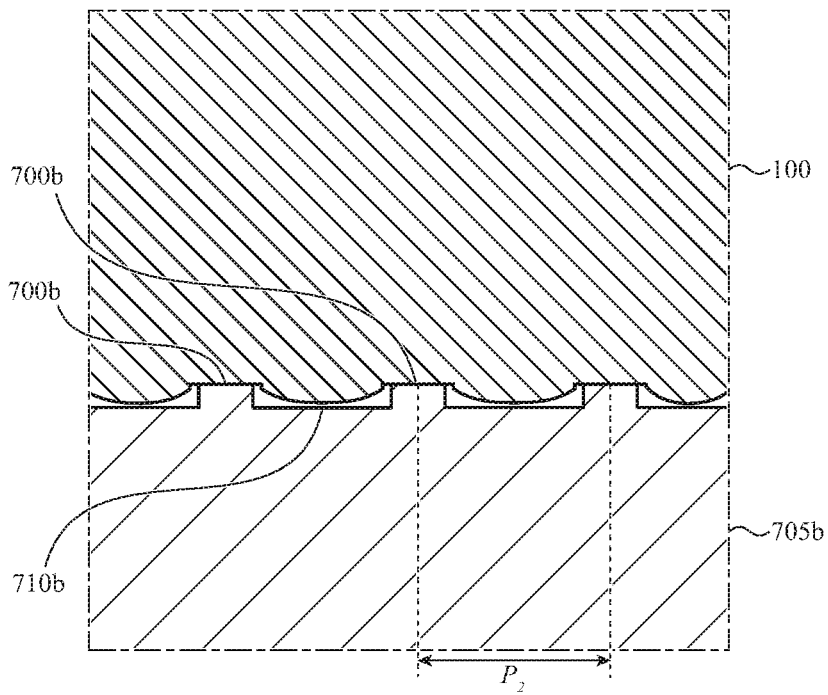
FIG. 7B shows a second sample distribution of tactile friction features on a glass surface.

FIGS. 7A and 7B illustrate tactile friction features having the same shape and size, but having different pitches between them. For example, in FIG. 7A tactile friction features 700a may be arranged at a distance represented by pitch $P_1$. As with prior embodiments, the tactile friction features 700a prevent the skin of the finger 100 from contacting the base surface 710a of the glass structure 705a also referred to herein as a channel or interstitial region.

Figure 8:
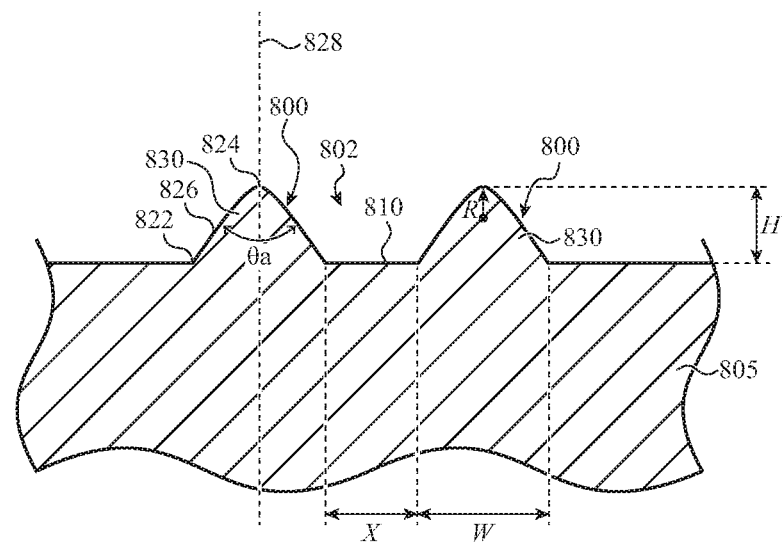
FIG. 8 is a cross-section view of tapered tactile friction features at an exaggerated scale.

FIG. 7B is a cross-section of a glass structure 705b having tactile friction features 700b separated by a larger pitch $P_2$. Although the skin of the finger 100 is closer to the base surface 710b of the glass structure 705b than in the embodiment of FIG. 7A, it nonetheless does not touch the base surface 710b. Given the lower density of tactile friction features in the embodiment of FIG. 7B as compared to FIG. 7A, the glass structure 705b of FIG. 7B may feel smoother or slipperier than the cover glass as shown in FIG. 7A. By contrast, the glass structure 705a shown in FIG. 7A may be more consistent in maintaining its coefficient of friction, and thus its feel, under a greater force than the glass structure 705b illustrated in FIG. 7B. It should thus be appreciated that increasing pitch between tactile friction features (or channel aspect ratio) may reduce friction with a finger or other object under a first input force, but may result in higher friction if the input force exceeds a threshold. As with other embodiments discussed herein, the value of that threshold is dependent on the physical characteristics of the tactile friction features, the user's skin, and so on FIG. 8 is a cross-sectional view illustrating two tactile friction features 800 extending upward from a base surface 810 of a glass structure 805. In embodiments, tactile friction features provided on an enclosure extend outward from the base surface 810 (e.g., away from the interior of the enclosure). As shown in FIG. 8, the tactile friction features 800 are generally tapered and include a conical portion 830 (also referred to as conical feature structure). In embodiments, the tactile friction features and the glass structure comprise the same glass material as the glass structure.

As shown in FIG. 8, the tactile friction features 800 have a base 822 located along base surface 810 and having a base width W. Tactile friction features 800 also have a tip 824 (also referred to as a "top") located at a height H above base surface 810. Tactile friction features 800 taper from base 822 to tip 824. Sidewall 826 extends from base 822 to tip 824 at a slope. At least a portion of sidewall 826 defines the conical portion 830 of tactile friction features 800. As shown in FIG. 8, the conical portion 830 may have the general shape of the frustum of a cone. In embodiments, base 822 defines a circular contour.

The sidewall 826 is obliquely angled with respect to a longitudinal axis 828 of the tactile friction feature 800. The sidewall 826 further defines an internal taper angle $\theta$ of conical portion 830 which is twice the angle between the sidewall 826 and the longitudinal axis 828. In embodiments, the internal taper angle $\theta$ is oblique, acute, right, or obtuse. The internal taper angle $\theta$ may be from 60 degrees and to 180 degrees, from 60 degrees to 120 degrees, or from 110 degrees to 170 degrees.

A set of tactile friction features may have an average height. In embodiments, a set of the tactile friction features has a substantially uniform height, so that the heights of individual tactile friction features in the set are substantially the same. In embodiments, the average height of the tactile friction features is from 100 nm to 10 microns, from 200 nm to 2 microns, or from 500 nm to 5 microns.

As shown in FIG. 8, base surface 810 may be substantially flat between tactile friction features 800. Therefore, the cover may have a substantially uniform thickness between the tactile friction features. In embodiments, the thickness of the cover may be uniform to within a specified amount of variation, such as +/−10%, +/−5%, or +/−2%.

The tactile friction features 800 have a base width W. For generally conical tactile friction features the base width may be a diameter. A set of tactile friction features may have an average base width. In embodiments, a set of the tactile friction features has a substantially uniform base width, so that the base widths of the individual tactile friction features in the set are substantially the same. In embodiments, the base widths of individual tactile friction features may be uniform to within a specified amount of variation, such as +/−10%, +/−5%, or +/−2%. In embodiments, the average base width of the set of tactile friction features is from 1 micron to 50 microns, from 2 microns to 50 microns, or from 5 microns to 25 microns. In embodiments, the average base width of the tactile friction features may be less than, equal to, or greater than the average height of the tactile friction features.

The tip 824 of tactile friction features 800 is generally smaller than the base 822. In embodiments, the tip 824 is rounded and may be characterized by a tip radius. In alternative embodiments, the tip 824 may be flat, so that the tactile friction feature has the form of a frustum of a cone.

As illustrated in FIG. 8, the tactile friction features 800 and the base surface 810 together define an interstitial region or channel 802. Typically the interstitial regions or channels 802 are not aligned along a given direction across a large portion of the glass surface in order to avoid anisotropy in the coefficient of friction (e.g., to avoid a "tramlining" effect). In embodiments, the tactile friction features are not arranged in a regular array, such as square or a hexagonal array, across a large portion the glass surface.

In embodiments, the tactile friction features 800 are separated by a distance X between bases of the adjacent tactile friction features (e.g., pitch minus tactile friction feature base diameter). For tapered tactile friction features having a sloped sidewall, the distance between the tips of 824 is greater than the distance X between the bases 822. In embodiments, the distance between the tips may be the pitch minus twice the tip radius R. When the tip radius R is small, the distance between the tips may be approximately equal to the pitch. In embodiments, the average spacing between adjacent bases may be less than, equal to, or greater than the average width of the bases. In embodiments, the average pitch is from 5 to 600 microns, from 10 to 100 microns, or from 5 to 50 microns.

In embodiments, the aspect ratio of the interstitial region or channel between tactile friction features 800 may be measured as the distance between the bases divided by the height of the tactile friction features. When the spacing between tactile friction features varies, a set of the tactile friction features may have an average channel spacing (or interstitial region width) and the channel aspect ratio may be a ratio of the average height to the average channel spacing. In embodiments, a ratio of the average height to the average channel spacing between features to produce a smooth effect is from 0.01 to 10, 0.01 to 2, or 0.05 to 5.

Figure 9A:
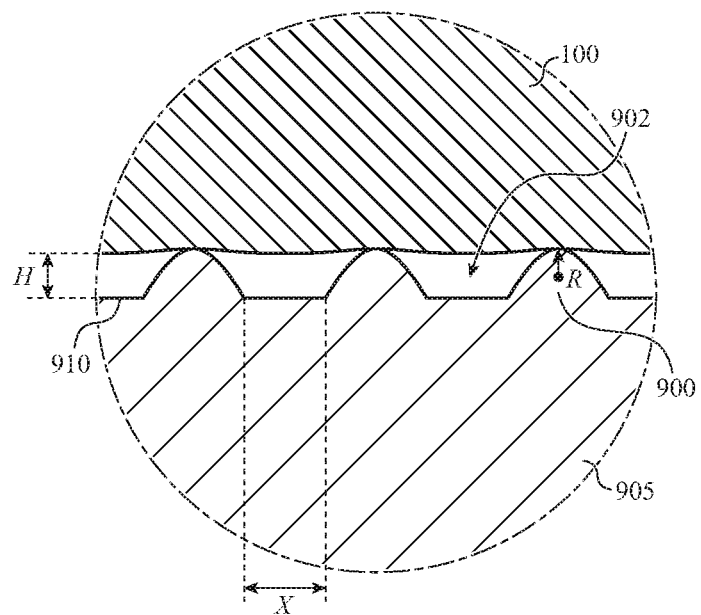
FIG. 9A is a cross-section view of a finger moving across tactile friction features at a first speed.
Figure 9B:
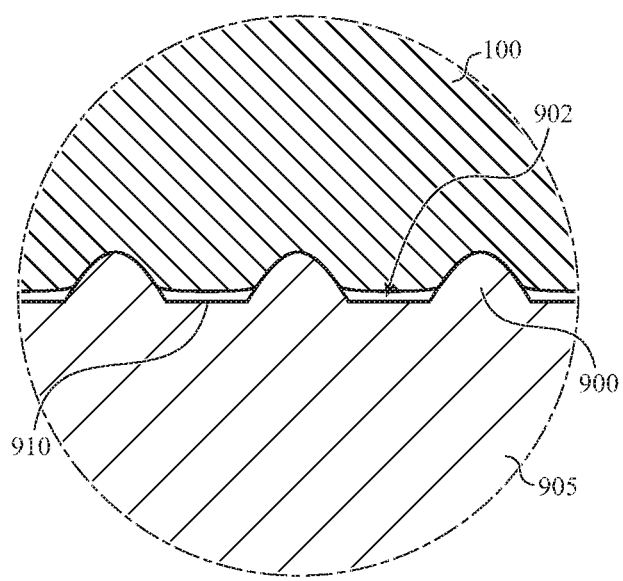
FIG. 9B is cross-section view of a finger moving across tactile friction features at a second speed less than the first speed of FIG. 9A.

In embodiments, the coefficient of friction of the tactile friction features may depend on the speed at which an object, such as a finger, moves across the tactile friction features. FIG. 9A schematically shows a finger 100 moving at a first speed across tactile friction features 900 while FIG. 9B schematically shows the finger 100 moving at a second speed, lower than the first speed, across the tactile friction features 900. As shown in FIGS. 9A and 9B, at higher speeds the finger has a lesser extent of deformation into the channel or interstitial region between the tactile friction features, decreasing the extent of interlocking and the coefficient of friction between the finger and the tactile friction features. In embodiments, the tactile friction features of FIGS. 9A and 9B have dimensions similar to those described for the tactile friction features of FIG. 8.

FIG. 9A shows a finger 100 moving across a set of tactile friction features 900. The finger 100 is moving at a speed at which it does not substantially deform into the interstitial region or channel 902. In embodiments, the channel aspect ratio of the tactile friction features 900 is such that the contact area and the coefficient of friction between the finger 100 and the tactile friction features 900 is lower than that of a flat glass surface, as previously described with respect to FIG. 5.

FIG. 9B shows a finger 100 moving across the same set of tactile friction features 900 at a speed where the finger 100 substantially deforms into interstitial region or channel 902. Therefore, the contact area and the coefficient of friction between the finger 100 and the tactile friction features 900 is greater than for the finger movement illustrated in FIG. 9A. However, the finger does not deform to the extent that it contacts the glass surface 910.

Figure 10A:
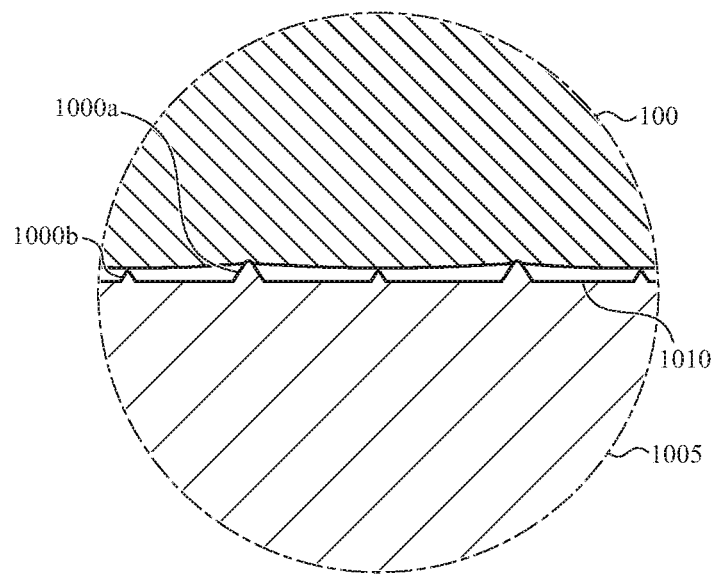
FIG. 10A is a first cross-section view of a finger contacting tapered tactile friction features formed on a glass surface.

FIG. 10A is a cross-sectional view of a finger 100 contacting tactile friction features 1000a, 1000b of a glass structure 1005. Here, the glass structure 1005 includes both large tactile friction features 1000a and small tactile friction features 1000b that are interspersed with the large tactile friction features 1000a. Generally, large (e.g., taller) tactile friction features 1000a are separated from one another by small tactile friction features 1000b, although in some embodiments the spacing, orientation, and the like of large and small features may be substantially random. The tactile friction features 1000a, 1000b extend from base surface 1010. In embodiments, the large tactile friction features 1000a may have a first average height and the small tactile friction features 1000b may have a second average height smaller than the first average height. In additional embodiments, a first set of glass tactile friction features may have a first average height and a second set of glass tactile friction features may have a second average height smaller than the first average height.

When the user's finger 100 exerts a first force against the glass structure 1005, the finger contacts the large tactile friction features 1000a but may not contact the smaller tactile friction features 1000b. Further, the channel aspect ratio and/or spacing (e.g., pitch) between the large tactile friction features 1000a is sufficient to prevent the skin from touching the base surface 1010 of the glass structure 1005.

Figure 10B:
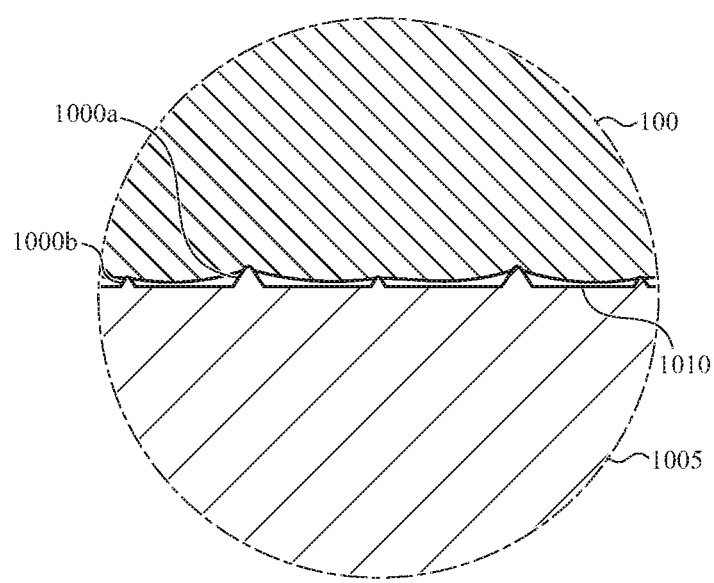
FIG. 10B is a second cross-section view of a finger contacting tapered tactile friction features formed on a glass surface.

As the user increases his or her input force, however, the skin deforms around the large tactile friction features 1000a and contacts the small tactile friction features 1000b, as shown in FIG. 10B. Here, the input force exerted by the user's finger 100 is greater than in FIG. 10A. For example, the user may exert 100 grams of force instead of 50 grams of force, although it should be understood these values are examples and not limiting.

Given the greater input force exerted by the user's finger 100, the finger deforms around the large tactile friction features 1000a. Put another way, the large tactile friction features 1000a press into the user's finger. The skin of the finger 100 is still prevented from touching the base surface 1010 of the glass structure 1005 by the small tactile friction features 1000b. The small tactile friction features 1000b thus may provide additional support to prevent contact between the finger 100 and the base surface 1010 of the glass when an input force increases beyond a threshold. Accordingly, in some embodiments tactile friction features of varying sizes, shaped, dimensions, or other physical characteristics may be used in a single region of a glass structure 1005.

Figure 11A:
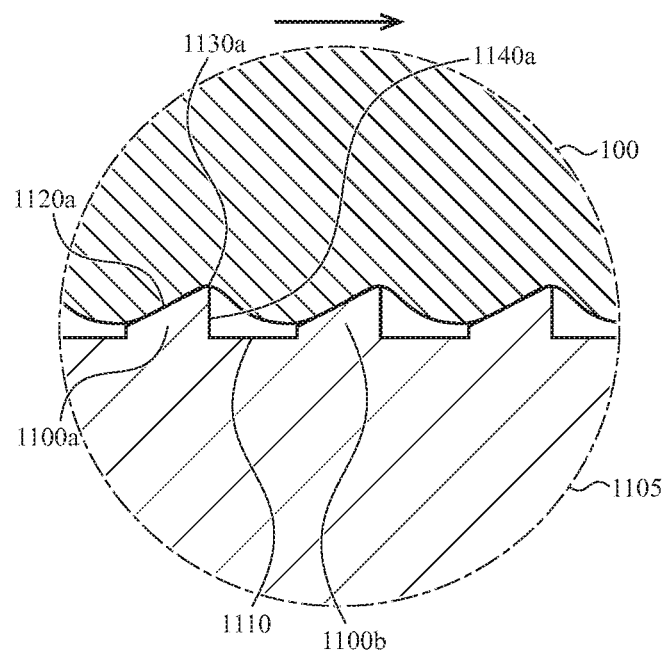
FIG. 11A is a cross-section view of a finger moving across a set of sloped tactile friction features in a first direction.
Figure 11B:
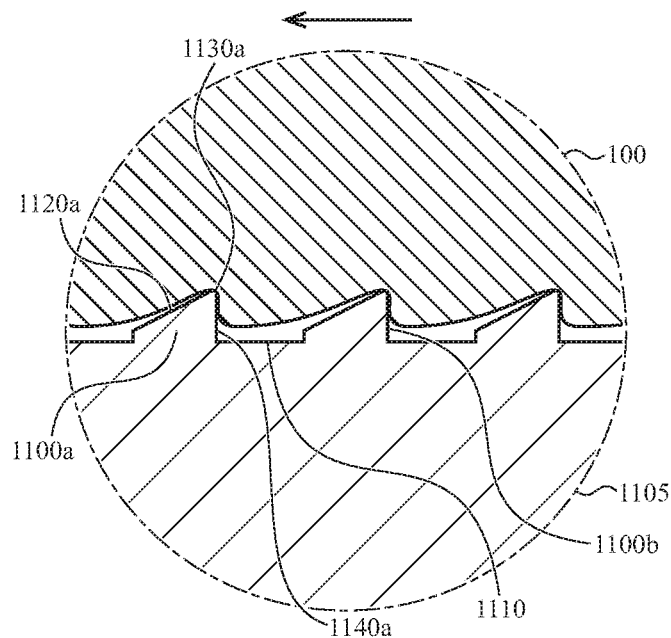
FIG. 11B is a cross-section view of finger moving across the set of sloped tactile friction features in a second direction.

FIGS. 11A and 11B illustrate cross-sections of a glass structure 1105 having tactile friction features 1100a, 1100b with a sloped or angled upper surface (e.g., contact surface). For example, the tactile friction feature 1100a has a sloped upper surface 1120a that meets a sidewall 1140a at a sharp angle defining a peak 1130a, as shown in FIGS. 11A-11B. As the finger 100 moves right across the tactile friction feature 1100a (shown in FIG. 11A), it engages the sloped upper surface 1120a and slides across the peak 1130a. The peak 1130a deforms the finger 100 to some relatively minor, gentle degree.

By contrast, as the finger moves left across the tactile friction features 1100a, 1100b (shown in FIG. 11B), it is pushed into the vertical sidewall of each such feature (e.g., 1140a). This causes the peak (e.g., 1130a) to press into the finger 100, deforming the skin of the finger to a much greater degree than in the example of FIG. 11A. This results both in greater mechanical friction and a greater contact area between finger 100 and glass structure 1105. The increased contact area (as compared to the motion shown in FIG. 11A) likewise increases intermolecular adhesions between the finger 100 and glass structure 1105. Accordingly, overall friction is greater when the finger moves to the left across the tactile friction features 1100 than when it moves to the right.

FIGS. 11A and 11B illustrate that tactile friction features can be configured to provide different coefficients of friction, and thus different feelings or perceptions of a surface, depending on a direction of motion of an object across that surface. The tactile friction features are keyed so that the surface feels smooth in a first direction but sticky or grippy in a second direction. Accordingly, the tactile friction features can be anisotropic in some embodiments.

Figure 12:
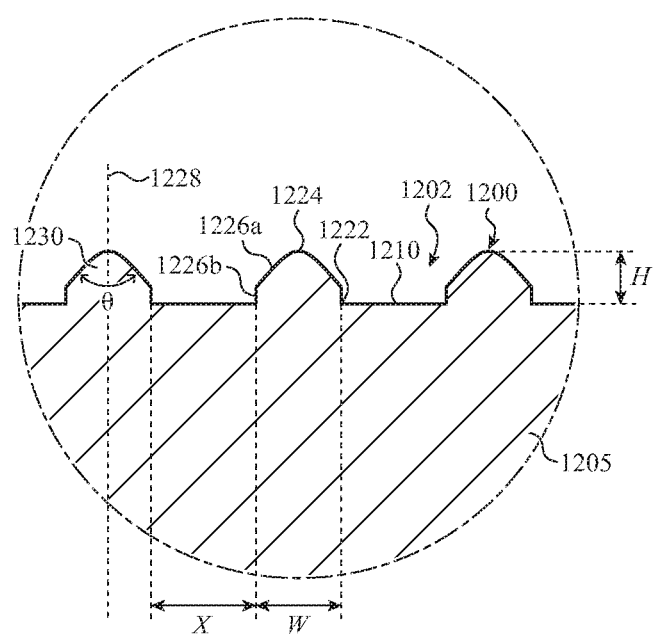
FIG. 12 shows a cross-section of a glass structure having tactile friction features with a peaked upper surface

FIG. 12 illustrates a cross-section of a glass structure 1205 having tactile friction features 1200 with an upper surface (e.g., contact surface) that defines a peak that is centrally located. The tactile friction features 1200 extend upward from a base surface 1210 of a glass structure 1205. In embodiments, tactile friction features provided on an enclosure extend outward from the base surface 1210 (e.g., away from the interior of the enclosure).

As shown in FIG. 12, the tactile friction features 1200 have a base 1222 located along the base surface 1210 and having a base width W. The tactile friction features 1200 also have a tip 1224 located at a height H above base surface 1210. Tactile friction features 1200 have a first sidewall portion 1226a and a second sidewall portion 1226b. The first sidewall portion 1226a is obliquely angled with respect to a longitudinal axis 1228 of tactile friction feature 1200. The first sidewall portion 1226a further defines an internal taper angle θ of conical portion 1230 which is twice the angle between the sidewall and the longitudinal axis 1228. In embodiments, the internal taper angle is oblique, acute, right, or obtuse. The internal taper angle θ may be from 60 degrees and to 180 degrees, from 60 degrees to 120 degrees, or from 110 degrees to 170 degrees. The first sidewall portion 1226a extends from the tip to join the second sidewall portion 1226b. The second sidewall portion 1226b extends outward from the base surface 1210 and may be substantially vertical (e.g., parallel to the longitudinal axis 1228 of tactile friction feature 1200). As shown in FIG. 12, base surface 1210 may be substantially flat between tactile friction features 1200.

The set of tactile friction features may have an average height. In embodiments, a set of the tactile friction features has a substantially uniform height, so that the heights of individual tactile friction features in the set are substantially the same. The average height may be as described for FIG. 8.

The tactile friction features 1200 have a base width W. When the second sidewall portion 1226b defines a generally cylindrical portion of a tactile friction feature 1200 the base width may be a diameter. A set of tactile friction features may have an average base width. In embodiments, a set of the tactile friction features has a substantially uniform base width, so that the base widths of the individual tactile friction features in the set are substantially the same. The average base width may be as described for FIG. 8.

In embodiments, the tactile friction features 1200 are separated by a distance X between bases of the adjacent tactile friction features (e.g., pitch minus tactile friction feature base diameter). In embodiments, the channel aspect ratio of the interstitial region or channel 1202 between tactile friction features 1200 may be measured as the distance between the bases or as the distance between the tips divided by the height of the tactile friction features. When the spacing between tactile friction features varies, a set of the tactile friction features may have an average channel spacing and the channel aspect ratio may be a ratio of the average height to the average channel spacing. The ratio of the average height to the average channel spacing between features may be as described for FIG. 8.

Figure 13:
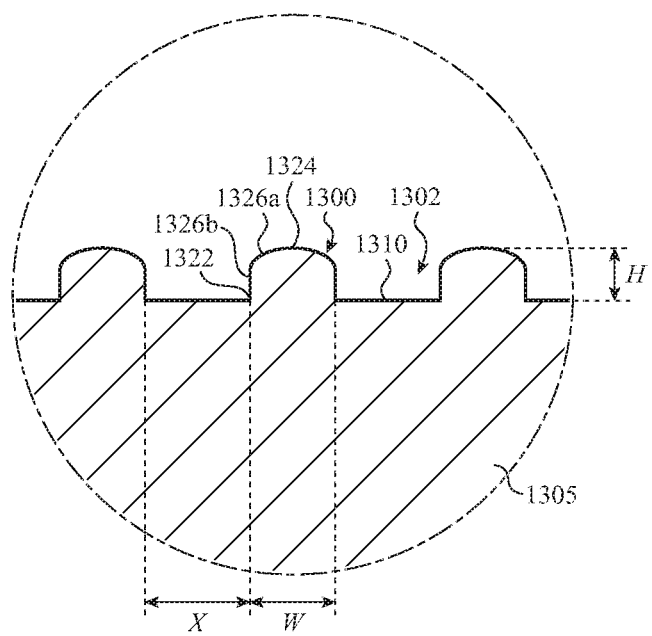
FIG. 13 shows a cross-section of a glass structure having tactile friction features with a rounded upper surface.

FIG. 13 illustrates a cross-section of a glass structure 1305 having tactile friction features 1300 with a rounded upper surface (e.g., contact surface). The tactile friction features 1300 extend upward from a base surface 1310 of a glass structure 1305. In embodiments, tactile friction features provided on an enclosure extend outward from the base surface 1310 (e.g., away from the interior of the enclosure). An interstitial region or channel 1302 is defined between adjacent tactile friction features 1300.

As shown in FIG. 13, the tactile friction features 1300 have a base 1322 located along the base surface 1310 and having a base width W. The tactile friction features 1300 also have a tip 1324 located at a height H above base surface 1310. Tactile friction features 1300 have a first sidewall portion 1326a and a second sidewall portion 1326b. The first sidewall portion 1326a defines a concave surface, also referred to as a rounded upper surface of the tactile friction feature 1300. The first sidewall portion 1326a extends from the tip to join the second sidewall portion 1326b. The second sidewall portion 1326b extends outward from the base surface 1310 and may be substantially vertical (e.g., parallel to the longitudinal axis of tactile friction feature 1300). As shown in FIG. 13, base surface 1310 may be substantially flat between tactile friction features 1300. The heights, widths, and channel aspect ratios of the tactile friction features may be as described for FIG. 12.

Figure 14:
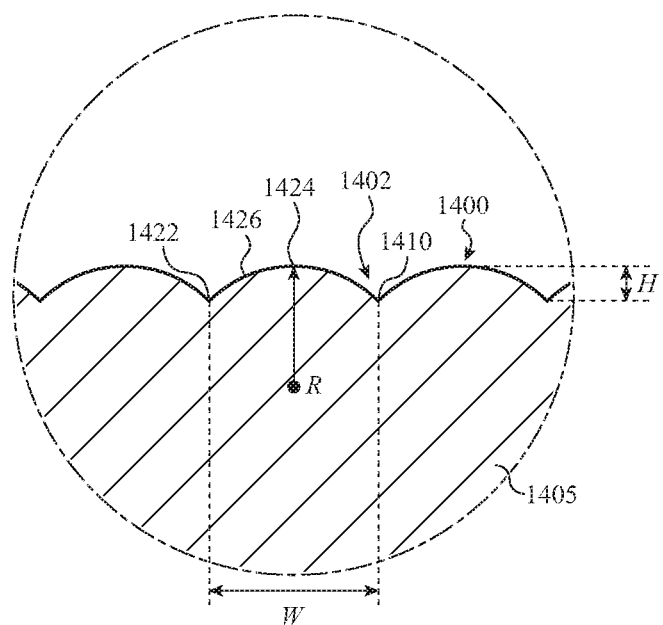
FIG. 14 shows a cross-section of an example glass structure having tactile friction features with a concave surface.

FIG. 14 illustrates a cross-section of a glass structure 1405 having tactile friction features 1400 with a concave surface. The tactile friction features 1400 extend upward from a base surface 1410 of a glass structure 1405. In embodiments, tactile friction features provided on an enclosure extend outward from the base surface 1410 (e.g., away from the interior of the enclosure). An interstitial region or channel 1402 is defined between adjacent tactile friction features 1400 even though the bases of adjacent tactile friction features 1400 may contact one another.

As shown in FIG. 14, the tactile friction features 1400 have a base 1422 located along the base surface 1410 and having a base width W. The tactile friction features 1400 also have a tip 1424 located at a height H above base surface 1410. Tactile friction features 1400 have a side surface 1426 which extends between the tip 1424 and the base 1422. The side surface 1426 defines a concave surface having a radius of curvature R. As shown in FIG. 14, base surface 1410 may be substantially flat between tactile friction features 1400. The heights and widths of the tactile friction features may be as described for FIG. 12 and the tactile friction features may be described by an aspect ratio defined as the height divided by the base width.

Figure 15:
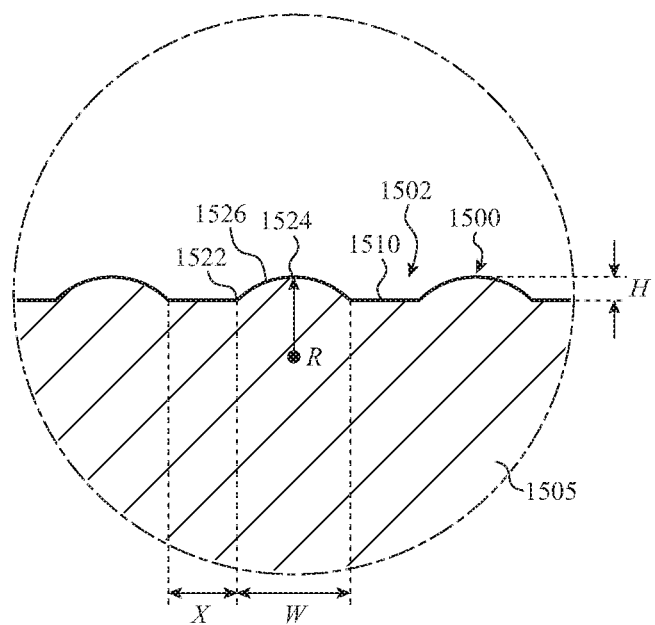
FIG. 15 illustrates a cross-section of another example glass structure having tactile friction features with a concave surface.

FIG. 15 illustrates a cross-section of another example glass structure 1505 having tactile friction features 1500 with a concave side surface. The tactile friction features 1500 extend upward from a base surface 1510 of the glass structure 1505. In embodiments, tactile friction features provided on an enclosure extend outward from the base surface 1510 (e.g., away from the interior of the enclosure). An interstitial region or channel 1502 is defined between adjacent tactile friction features 1500.

As shown in FIG. 15, the tactile friction features 1500 have a base 1522 located along the base surface 1510 and having a base width W. The tactile friction features 1500 also have a tip 1524 located at a height H above base surface 1510. Tactile friction features 1500 have a side surface 1526 which extends between the tip 1524 and the base 1522. The side surface 1526 may define a concave curve having a radius of curvature R; the radius of curvature R of the tactile friction features shown in FIG. 15 is less than that of the tactile friction features of FIG. 14. As shown in FIG. 15, base surface 1510 may be substantially flat between tactile friction features 1500. The heights, widths, and channel aspect ratios of the tactile friction features may be as described for FIG. 12.

As previously mentioned, tactile friction features may be incorporated into a cover glass or other surface above a display of an electronic device. In some embodiments the shape, size, pitch or other physical characteristic of the tactile friction features, or aspect ratio of channels, may be selected to reduce or eliminate optical distortion. As one non-limiting example, stepped edges, sharp angles, and the like between exterior surfaces of a tactile friction feature and/or a base surface may be avoided in order to reduce or prevent diffraction, sparkling effects, or the like when a display is active. In some embodiments, tactile friction features may be positioned between pixels of a display but not directly over display pixels, again to reduce or minimize optical aberrations when the display is operating. In additional embodiments, a width of the tactile friction features is different from a pixel size of the display. For example, the width of the tactile friction features may be greater than the pixel size of the display or smaller than the pixel size of the display. In still other embodiments physical characteristics of the tactile friction features may be configured to match a harmonic wavelength of light passing through them in order to avoid or reduce optical aberrations.

In embodiments, the tactile friction features may provide additional optical effects. In further embodiments, a surface with the tactile friction features may have a reflectance or transmittance which differs from that of a corresponding surface without the tactile friction features. For example, the surface with the tactile friction features may have a lower reflectance and/or a lesser amount of specular reflection than the corresponding surface.

In additional embodiments, the tactile friction features may provide an anti-glare effect. For example, the tactile friction features may provide an anti-glare effect by increasing scattering of light from the tactile friction features as compared to a surface without the tactile friction features. In embodiments, the anti-glare effect provided by the tactile friction features does not unduly reduce the distinctness of image (DOI). As examples, tactile friction features having a conical, semi-conical, or pyramidal shape may be used to provide an anti-glare effect.

Further, the tactile friction features may provide an anti-reflective effect by reducing the amount of reflected light as compared to a corresponding surface without the tactile friction features. Similarly, the tactile friction features increase the amount of transmitted light (e.g. visible light) as compared to the corresponding surface. In embodiments, the anti-reflective effect provided by the tactile friction features does not unduly darken the appearance of the glass structure. For example, the anti-reflective effect may depend, at least in part, on the percentage of the base surface covered by the tactile friction features. In embodiments, the greater amount of coverage of the base surface by the tactile friction features produces a greater reduction in the reflectivity of the glass structure. As an example, the percentage coverage of the base surface may range from 5% to 50%.

Further, the ratio of the average diameter of the tactile friction features to the average pitch may be used as a measure of the coverage of the base surface by the tactile friction features. In embodiments, the ratio of the average base diameter of cone-shaped tactile friction features to the average pitch may be less than one, less than 0.75, less than 0.5, less than 0.25, less than 0.1, or from 0.05 to 0.5 to limit the anti-reflective effect. In further embodiments, if the height and the spacing of tapered tactile friction features are less than wavelengths of visible light (e.g., less than one micron) the tactile friction feature may function as graded refractive index (GRIN) structure and produce an anti-reflective effect thereby.

The tactile friction features discussed herein may be formed in any of a variety of ways, including by lithography in combination with chemical etching, laser ablation, mechanical removal of material, and so on. Any suitable method of manufacture is contemplated and embraced by the embodiments described herein. In embodiments, the composition of the tactile friction features (excluding any surface coating) is substantially the same as that of the base surface and/or the underlying cover.

By the way of example, a process for forming the glass tactile friction features may include an operation of forming or applying a mask on the surface of a glass structure. The mask has a pattern configured to produce the desired shape and arrangement of the glass tactile friction features during a subsequent etching step. An operation of forming a mask may include applying a layer of a resist material to the surface of the glass structure and then forming a pattern in the resist material, such as a pattern of apertures or a pattern including different thicknesses of the resist material.

In some aspects, the mask is formed by imprint lithography, such as nano-imprint lithography. In embodiments, the mask is formed by pressing a patterned tool into a softened polymeric resist material to form a thickness pattern in the resist material. For example, the thickness pattern may have thinner regions corresponding to the interstitial regions and thicker regions corresponding to the locations of the glass tactile friction features. When the glass tactile friction features have a generally conical or rounded shape, the thickness of the thicker regions typically varies accordingly. The tool may be patterned by a variety of methods including, but not limited to, micro-machining, laser direct writing, grayscale lithography, or an imprinting process. The resist material may be softened by heating it to a temperature above a glass transition temperature and below a temperature at which undue flow of the resist material occurs.

In further aspects, the mask is formed by photolithography, in which case the resist material may be a positive or negative photoresist. Suitable photolithography techniques include, but are not limited to, binary photolithography techniques and 3-D photolithography techniques (e.g., multiple-step, direct-write, and grayscale mask photolithography).

An operation of applying a mask may include applying a patterned hard mask to the surface of the glass structure. For example, a hard mask may be formed of or include a metal, silicon, silicon nitride, or a polymer with an etch resistant layer on the backside (the side facing away from the enclosure to be coated).

A process for forming the glass tactile friction features typically includes an etching operation after the operation of forming or applying the mask on the surface. For example, when the mask defines gaps or apertures, the etching operation may include etching away a portion of the glass structure through gaps or apertures in the mask. When the mask defines thicker and thinner portions of the resist material, the etching operation may include etching the thinner portions of the mask to create gaps or apertures in the mask (resist material) prior to etching away a portion of the glass structure. For example, the portion of the glass structure to be etched may be removed using a dry etching technique. Dry etching techniques include, but are not limited to reactive ion etching.

Although embodiments have generally been described with respect to a glass structure or surface, it should be appreciated that tactile friction features may be formed on or from any suitable substrate, including metal, ceramic, glass ceramic, plastic, combinations of materials, and so on. Accordingly, examples discussing glass tactile friction features and processes for making glass tactile friction features are illustrative and not limiting.

In addition, any of the tactile friction features, glass surfaces, or combinations thereof described herein may be coated with a material to provide resistance to oils and other deposits. In this case, the coating may also at least partially define the touch-sensitive surface of the electronic device. For example, the material may comprise a fluorinated material, such as a fluorinated oligomer or polymer, to impart oleophobic and/or hydrophobic properties. For example, the contact angle of an oil on the coating may be greater than or equal to about 65 degrees or about 70 degrees. As an additional example, the contact angle of water on the coating may be greater than or equal to 90 degrees. The fluorinated material may comprise a linear (non-branched) fluorinated molecule such as a linear fluorinated oligomer or a linear fluorinated polymer.

For example, a coating comprising a fluorinated material may be applied to both the tactile friction features and the base surface. In embodiments, the layer of the fluorinated material is from 5 nm to 20 nm or from 10 nm to 50 nm. The layer of the fluorinated material may be bonded directly to the tactile friction features or may be bonded to an intermediate adhesion layer. The layer of the fluorinated material may be thin relative to the dimensions of the tactile friction features.

As an additional example, an adhesion layer may be applied to both the tactile friction features and the base surface and then a coating comprising the fluorinated material applied to the adhesion layer. The adhesion layer may comprises an inorganic material, may comprise a silicon oxide, such as silicon dioxide, or may consist essentially of silicon dioxide. In additional embodiments, the thickness of the adhesion layer is 10 nm or less, such as from 1 nm to 10 nm or from 1 nm to 5 nm.

In embodiments, the glass structure is chemically strengthened by ion exchange. As an example, ions present in the glass are exchanged for larger ions in an ion-exchange bath to form a compressive stress layer extending from a surface of the glass structure. In embodiments, the compressive stress layer extends at least partially into the tactile friction features. Generally, the ion-exchange operation precedes application of a coating of fluorinated material to the tactile friction features.

Ion-exchangeable glasses include, but are not limited to, soda lime glasses, aluminosilicate glasses, and aluminoborosilicate glasses. For example, an ion-exchangeable glass may include monovalent or divalent ions such as alkali metal ions (e.g., $Li^+$, $Na^+$, or $K^+$) or alkaline earth ions (e.g., $Ca^{2+}$ or $Mg^{2+}$) which may be exchanged for other alkali metal or alkaline earth ions. For example, if the glass structure comprises sodium ions, the sodium ions may be exchanged for potassium ions. Similarly, if the glass structure comprises lithium ions, the lithium ions may be exchanged for sodium ions and/or potassium ions.

Figure 16:
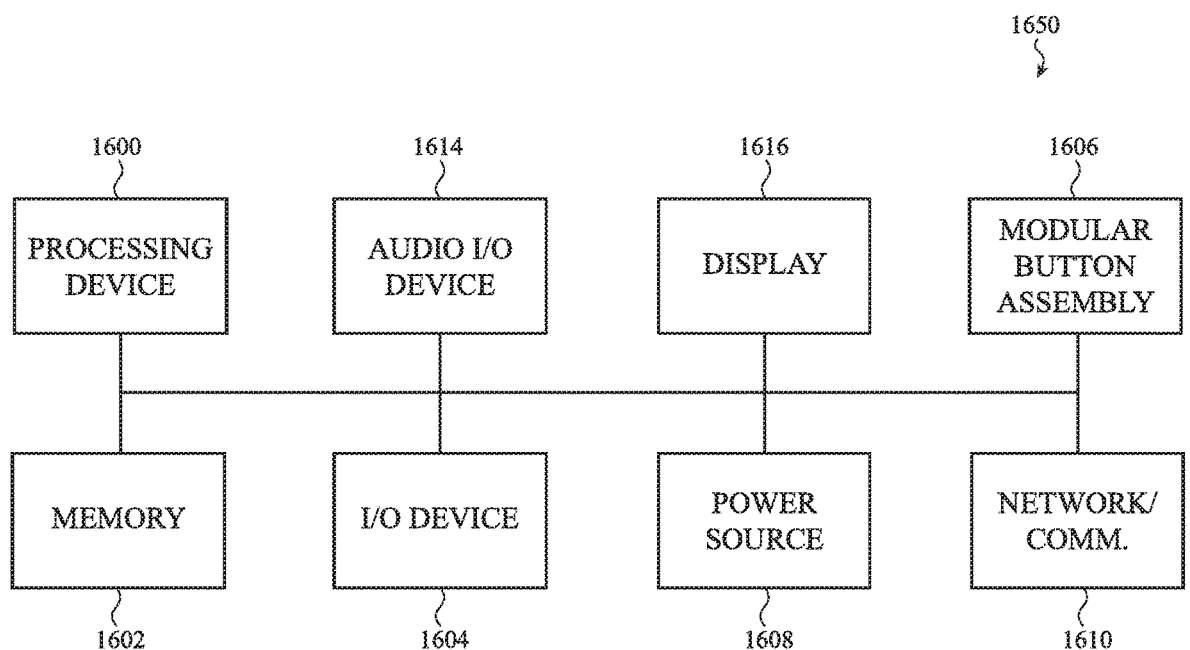
FIG. 16 is a block diagram of a sample electronic device that can incorporate a glass structure having tactile friction features.

FIG. 16 is an illustrative block diagram of an electronic device 1650 as described herein (e.g., electronic device 200 of FIG. 2, for example). The electronic device can include a display 1616, one or more processing units 1600, memory 1602, one or more input/output (I/O) devices 1604 such as a button assembly 1606, a power source 1608, and a network communication interface 1610.

The display 1616 may provide an image or graphical output (e.g., computer-generated image data) for the electronic device. The display may also provide an input surface for one or more input devices, such as, for example, a touch sensing device and/or a fingerprint sensor. The display 1616 may be substantially any size and may be positioned substantially anywhere on the electronic device. The display 1616 can be implemented with any suitable technology, including, but not limited to liquid crystal display (LCD) technology, light emitting diode (LED) technology, organic light-emitting display (OLED) technology, organic electroluminescence (OEL) technology, or another type of display technology. The display 1616 provides a graphical output, for example associated with an operating system, user interface, and/or applications of the electronic device 1650. In some embodiments, the display 1616 is configured as a touch-sensitive (e.g., single-touch, multi-touch) and/or force-sensitive display to receive inputs from a user. In some embodiments, the touch-sensitive display includes one or more sensors (e.g., capacitive touch sensors, ultrasonic sensors, or other touch sensors) positioned above, below, or integrated with the display. In various embodiments, a graphical output of the display 1616 is responsive to inputs provided to the electronic device 1650.

It should be appreciated that the display 1616 may include, or be covered by, a cover glass incorporating tactile friction features as described herein.

The processing unit 1600 can control some or all of the operations of the electronic device. The processing unit 1600 can communicate, either directly or indirectly, with substantially all of the components of the electronic device. For example, a system bus or signal line or other communication mechanisms (e.g., electronic connectors) can provide communication between the processing unit(s) 1600, the memory 1602, the I/O device(s) 1604, the power source 1608, and/or the network communication interface 1610. The one or more processing units 1600 can be implemented as any electronic device capable of processing, receiving, or transmitting data or instructions. For example, the processing unit(s) 1600 can each be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "processing unit" or, more generally, "processor" refers to a hardware-implemented data processing unit or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The memory 1602 can store electronic data that can be used by the electronic device. For example, a memory can store electrical data or content such as, for example, audio and video files, documents and applications, device settings and user preferences, timing signals, signals received from the one or more sensors, one or more pattern recognition algorithms, data structures or databases, and so on. The memory 1602 can be configured as any type of memory. By way of example only, the memory can be implemented as random access memory, read-only memory, flash memory, removable memory, or other types of storage elements, or combinations of such devices.

The one or more I/O devices 1604 can transmit and/or receive data to and from a user or another electronic device. The I/O device (s) 1604 can include any components discussed herein to provide tactile outputs, including input structures, tactile features, and the like. The I/O device(s) 1604 can further include a display, a touch or force sensing input surface such as a trackpad, one or more buttons, one or more microphones or speakers, one or more ports such as a microphone port, one or more accelerometers for tap sensing, one or more optical sensors for proximity sensing, and/or a keyboard. The I/O devices 1604 may include a surface configured for contact by a user or an object; such surface may incorporate tactile friction features as discussed herein. As one example, a button assembly 1606 may include a cap or other surface formed from glass, ceramic, plastic, or any other suitable material. That cap or surface may have tactile friction features.

The power source 1608 can be implemented with any device capable of providing energy to the electronic device. For example, the power source 1608 can be one or more batteries or rechargeable batteries, or a connection cable that connects the electronic device to another power source such as a wall outlet.

The network communication interface 1610 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

It should be noted that FIG. 16 is for illustrative purposes only. In other examples, an electronic device may include fewer or more components than those shown in FIG. 16. Additionally or alternatively, the electronic device can be included in a system and one or more components shown in FIG. 16 are separate from the electronic device but included in the system. For example, an electronic device may be operatively connected to, or in communication with a separate display. As another example, one or more applications can be stored in a memory separate from the electronic device. The processing unit in the electronic device can be operatively connected to and in communication with the separate display and/or memory.

As used herein, the terms "about", "approximately," "substantially," and "substantially equal to" are used to account for relatively small variations, such as a variation of +/−10%, +/−5%, or +/−2%.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
an enclosure defining an internal volume and having a glass structure at least partially defining a touch-sensitive exterior surface of the electronic device, the touch-sensitive exterior surface comprising:
   a base surface defining a first planar region having a first area; and
   a set of tactile friction features distributed along the touch-sensitive exterior surface and extending from the base surface to define:
      a plurality of substantially flat tops, the plurality of substantially flat tops defining a second planar region having a second area less than the first area;
      a micro-scale average width; and
      a height defined by an offset between the second planar region and the first planar region, the height less than the micro-scale average width; and
   a touch sensor positioned below the glass structure and configured to detect a touch gesture along the touch-sensitive exterior surface, the set of tactile friction features providing a frictional resistance to the touch gesture.

2. The electronic device of claim 1, wherein:
each tactile friction feature of the set of tactile friction features has a circular contour defining a diameter ranging from 1 micron to 20 microns; and
the height is less than or equal to 5 microns.

3. The electronic device of claim 1, wherein:
the electronic device further comprises a display positioned under the glass structure;
the glass structure comprises:
   a first region positioned over a visible portion of the display; and
   a second region at least partially surrounding the first region and not positioned over the visible portion of the display;
the set of tactile friction features is a first set of tactile friction features positioned along the first region;
the electronic device further comprises a second set of tactile friction features positioned along the second region; and
a first pitch between tactile friction features of the first set of tactile friction features is greater than a second pitch between tactile friction features of the second set of tactile friction features.

4. The electronic device of claim 3, wherein:
the first pitch is measured as an average distance between centers of adjacent tactile friction features; and
the first pitch is between 5 and 600 microns.

5. The electronic device of claim 1, wherein:
the touch gesture is provided by a user's finger in contact with the touch-sensitive exterior surface; and
the set of tactile friction features prevents the user's finger from contacting the base surface.

6. An electronic device comprising:
a display;
a touch sensor positioned over the display; and
an enclosure comprising a glass structure enclosing the display and defining an exterior surface of the electronic device, a touch-sensitive region of the exterior surface of the electronic device positioned over the touch sensor and defining a substantially planar base surface and a set of glass tactile friction features extending from the substantially planar base surface, each glass tactile friction feature of the set of glass tactile friction features including:
   a base having a micro-scale width;
   a top;
   a sidewall extending from the base to the top; and
   a height between the base and the top, the height being less than or equal to the micro-scale width,
wherein:
the tops of multiple glass tactile friction features of the set of glass tactile friction features are substantially flat; and
the set of glass tactile friction features are configured to provide a frictional resistance to a touch applied to the touch-sensitive region.

7. The electronic device of claim 6, wherein:
the set of glass tactile friction features is substantially evenly distributed over the touch-sensitive region; and
the frictional resistance is due, at least in part, to contact between a user's finger and the tops of the multiple glass tactile friction features of the set of glass tactile friction features.

8. The electronic device of claim 6, wherein the substantially planar base surface includes an interstitial region that defines a substantially random spacing between the bases of adjacent pairs of the set of glass tactile friction features.

9. The electronic device of claim 7, wherein:
the touch includes a gesture; and
the user's finger does not touch the substantially planar base surface when performing the gesture.

10. The electronic device of claim 8, wherein an average spacing between adjacent bases along the substantially planar base surface is less than an average width of micro-scale widths of the bases.

11. The electronic device of claim 6, wherein an average height of the set of glass tactile friction features ranges from 50 nm to 2 μm.

12. The electronic device of claim 6, wherein:
the sidewall defines a conical portion and an oblique internal taper angle of each glass tactile friction feature.

13. The electronic device of claim 12, wherein:
the set of glass tactile friction features is a first set of glass tactile friction features having a first height;
the exterior surface of the electronic device has a second set of glass tactile friction features that is interspersed with the first set of glass tactile friction features; and
the first height of the first set of glass tactile friction features is greater than a second height of the second set of glass tactile friction features.

14. The electronic device of claim 6, wherein the enclosure further comprises an oleophobic coating including a fluorinated material bonded to the set of glass tactile friction features.

15. An electronic device comprising:
a display;
a touch sensor; and
an enclosure at least partially surrounding the display and including a glass structure defining a touch-sensitive input region positioned over the touch sensor, the touch-sensitive input region defining:
a substantially flat base surface; and
a set of tactile friction features extending outward from the substantially flat base surface and defining:
a plurality of substantially flat top surfaces having an average width ranging from 1 to 20 microns and at least partly providing a frictional resistance to the touch-sensitive input region;
an average height less than or equal to the average width; and
adjacent pairs of tactile friction features of the set of tactile friction features having circular bases separated by an interstitial region of the substantially flat base surface.

16. The electronic device of claim 15, wherein:
the glass structure is positioned over both the display and the touch sensor;
the glass structure includes a display window region;
the set of tactile friction features is distributed along the display window region; and
the touch sensor is configured to detect a touch on the glass structure along the display window region.

17. The electronic device of claim 15, wherein:
the interstitial region defines an average spacing between adjacent tactile friction features; and
a ratio of the average height to the average spacing of the set of tactile friction features ranges from 0.005 to 10.

18. The electronic device of claim 17, wherein each tactile friction feature of the set of tactile friction features has a circular contour and each of the plurality of substantially flat top surfaces is offset from the substantially flat base surface by a distance of less than or equal to 2 microns.

19. The electronic device of claim 15, wherein:
the set of tactile friction features has a uniform width; and
the uniform width is smaller than a pixel size of the display.

20. The electronic device of claim 15, wherein the set of tactile friction features is configured to allow finger contact with top surfaces of an adjacent pair of tactile friction features without contacting the interstitial region of the substantially flat base surface.

* * * * *